(12) United States Patent
Washington et al.

(10) Patent No.: US 6,515,682 B1
(45) Date of Patent: *Feb. 4, 2003

(54) SYSTEM AND METHOD FOR EDITING A CONTROL UTILIZING A PREVIEW WINDOW TO VIEW CHANGES MADE TO THE CONTROL

(75) Inventors: Jeff D. Washington, Round Rock, TX (US); Paul F. Austin, Austin, TX (US)

(73) Assignee: National Instruments Corporation, Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/644,119

(22) Filed: May 9, 1996

(51) Int. Cl.[7] ................................................. G06F 3/00
(52) U.S. Cl. ...................................... 345/762; 345/765
(58) Field of Search ............................... 395/333, 334, 395/335, 346, 966, 967, 970, 965; 345/331, 333, 334, 340, 346, 966, 975, 762, 765, 781, 804

(56) References Cited

U.S. PATENT DOCUMENTS

| | | | |
|---|---|---|---|
| 4,901,211 A | * | 2/1990 | Kodosky et al. ............. 345/967 |
| 5,335,320 A | * | 8/1994 | Iwata et al. .................. 395/333 |
| 5,339,392 A | * | 8/1994 | Risberg et al. .............. 395/333 |
| 5,438,659 A | | 8/1995 | Notess et al. |
| 5,555,369 A | * | 9/1996 | Menendez et al. ........... 395/334 |
| 5,555,370 A | * | 9/1996 | Li et al. ....................... 345/334 |
| 5,603,034 A | * | 2/1997 | Swanson ..................... 395/333 |
| 5,613,058 A | | 3/1997 | Koppolu et al. |
| 5,615,367 A | | 3/1997 | Bennett et al. |
| 5,651,108 A | * | 7/1997 | Cain et al. ................... 345/340 |
| 5,664,208 A | | 9/1997 | Pavley et al. |

* cited by examiner

*Primary Examiner*—Cao H. Nguyen
(74) *Attorney, Agent, or Firm*—Jeffrey C. Hood

(57) ABSTRACT

A method for editing an OLE control comprises a user dragging an icon representation of the control and dropping the control onto a form of a container which contains OLE controls, such as Visual Basic. When the user drops the control, the container constructs the control and displays the control in the form. When a user selects the control for an editing transaction the control creates a property page dialog, creates a preview window and displays the control in the preview window. The user makes changes to the control via the property page dialog. The property page dialog invokes a method on the control to display the control with the changes reflected in the preview window so that the user can see the effect of the changes on the control. The display method is an alternate method to the standard display method defined by the interface between the container and the control. Preferably the alternate display method receives additional input parameters which contain information describing the changes. The control's data is not modified and thus the changes are not reflected in the control displayed in the form window until the user applies the changes. The user edits the control as desired in the preview window and applies the changes or cancels the changes. If the user applies the changes, the control's data is updated to reflect the changes. If the user cancels the changes, the preview window and property page dialog are discarded. Thus, an improved container independent method for editing a control, wherein changes may be viewed and evaluated prior to applying the changes to the control is described.

44 Claims, 26 Drawing Sheets

Microfiche Appendix Included
(1 Microfiche, 69 Pages)

SYSTEM AND METHOD FOR EDITING A CONTROL UTILIZING A PREVIEW WINDOW TO VIEW CHANGES MADE TO THE CONTROL

BACKGROUND OF THE INVENTION

1. Microfiche Appendix

The present disclosure includes a microfiche appendix comprising 1 microfiche and 69 frames. The microfiche appendix comprises appendix A, which contains source code listings of one embodiment of the present invention.

2. Field of the Invention

The present invention relates to the field of graphical and non-graphical software controls, and more particularly to editing controls.

3. Description of the Related Art

Graphical software controls have become commonplace in the field of user interfaces to computer programs, particularly software applications which make use of the graphical user interface (GUI). Examples of controls are list boxes, option buttons, scroll bars, check boxes, text boxes, picture boxes, command boxes, meters, gauges, charts, spread sheet displays, etc. The controls are commonly an integral part of the user interface to "MICROSOFT WINDOWS" software applications, for example. The controls are used to get user input and to display output. Additionally, controls can be created for non-user interface components such as timers, interfaces to hardware and data acquisition.

An example of an area in which software applications use controls is in the field of software controlled instrumentation systems. It is common in the field of instrumentation systems for users to interact with instruments via software front panel interfaces rather than through hardware front panels. The instrumentation software programs commonly employ graphical controls such as switches, buttons, knobs, dials, meters, graphs, slider controls, slider indicators, etc. similar to those found on hardware front panels.

Programming systems such as "VISUAL BASIC" provide an environment for software application developers to create user interfaces including controls. Typically, programming environments provide a set of standard controls. Referring now to FIG. 1, a screen shot of a Visual Basic 4.0 screen is shown. A toolbox of standard controls which Visual Basic 4.0 provides is shown.

Object Linking and Embedding (OLE) Controls, also referred to as Active X Controls, are software components that conform to a standard defined by "MICROSOFT". In many ways, OLE controls are similar to traditional libraries. However, since the standard is well defined, there are many applications that can use any OLE control simply by providing support for the OLE standard. Applications or programming environments which support OLE controls are commonly referred to as "OLE Control Containers" or simply "containers". Examples of containers are Microsoft's "EXCEL" spreadsheet product, "WORD" word processor, "ACCESS" database product, and Visual Basic programming environment. The OLE standard affords software application developers the opportunity to develop custom OLE controls to add into and use in their software applications. Much arduous work is needlessly repeated if a given control must be re-developed for each container. Broadly speaking, a container is a software entity which holds software components.

Controls are typically objects. Therefore, each control has its own set of methods, events and properties. A method is a function which acts on a particular control. For example, a control may possess a "move" method to move the control around on a display screen. An event is an action recognized by a control, such as clicking a mouse or pressing a key. A control has associated code which executes in response to an event recognized by the control. A property is the control's data (settings or attributes), such as color, shape or size. The properties of a control may be edited, i.e., changed to create the desired user interface.

Controls may have custom properties that are specific to the control. For example, a gauge may have the properties StartAngle and EndAngle describing the range in which the needle may be positioned. A button may have the properties OnColor, and OffColor for two different states. The ability to have custom properties, which the OLE standard provides, is generally more desirable than a standard which restricts properties on a component to a predefined set such as minimum, maximum, and color. However, this ability also presents a challenge to development systems that use the controls. Since each control may have its own unique properties, it is difficult for containers to present the custom properties of the controls to the user for configuration. This is where other attempts at control standards, such as the .VBX standard, have not been as successful as the OLE control standard.

Referring now to FIG. 2, a screen shot shows an instance of a slider control which has been dragged from the toolbox and dropped onto the Form1. The slider has associated properties, which are listed in the Properties window. The developer changes the properties by selecting a property field, such as "Max" (which is set to 10 in FIG. 2), and changing the value. The control reflects the change when the developer enters the change into the Properties window.

In many cases, a list of all properties on the control, such as is provided in the Properties window, is not the most intuitive way for a user to configure a control. Hence, OLE controls can also define one or more interactive dialog boxes for configuring the control in edit-time. These displays are called "Property Page Dialogs", or "Property Sheets". Property sheets allow the OLE control developer to tailor the tools for configuring the properties of the control.

Referring now to FIG. 3, a screen shot shows a Slider Control Properties page dialog in which the developer changes the properties of the slider. FIG. 4 shows the Max tick value property changed from 10 to 20, which is reflected in the slider now having 20 tick marks, rather than 10.

While property sheets allow the developer to present the properties of the control in an intuitive way, property sheets also introduce a new set of problems. For example, as was described in the discussion of FIG. 2, Visual Basic's property window permits the user to see the effects of changing individual properties as the changes are made. However, as was described in the discussion of FIGS. 3 and 4, property page dialogs do not show the changes until the "Apply" button is pressed, and pressing the Apply button applies all changes. If the changes resulted in an undesired behavior, no mechanism exists for undoing the changes, and if multiple changes are made before applying the changes, restoring the control to its original state may prove difficult since the user must remember all the previous settings of the control. A better solution would allow the user to see the effect of all changes without committing or applying them to the control.

Hence, an improved method for editing a control is desired, wherein changes are viewed and evaluated prior to applying the changes to the control. Further, it is desirable for the method to be container independent.

SUMMARY OF THE INVENTION

The present invention comprises a novel method for editing an OLE control. The method comprises a user dragging an icon representation of the control and dropping the control onto a form of a container which contains OLE controls, such as Visual Basic. When the user drops the control, the container constructs the control and displays the control in the form. When a user selects the control for an editing transaction the control creates a property page dialog, creates a preview window and displays the control in the preview window.

The user makes changes to the control via the property page dialog. The property page dialog invokes a method on the control to display the control with the changes reflected in the preview window so that the user can see the effect of the changes on the control. The display method is an alternate method to the standard display method defined by the interface between the container and the control. Preferably the alternate display method receives additional input parameters which contain information describing the changes. The control's data is not modified and thus the changes are not reflected in the control displayed in the form window until the user applies the changes. The user edits the control as desired in the preview window and applies the changes or cancels the changes. If the user applies the changes, the control's data is updated to reflect the changes. If the user cancels the changes, the preview window and property page dialog are discarded.

Thus, the present invention advantageously provides an improved container independent method for editing a control, wherein changes may be viewed and evaluated prior to applying the changes to the control.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

The following references are hereby incorporated by reference.

For general information on object oriented programming concepts, please see Booch, *Object-Oriented Analysis and Design with Applications*, The Benjamin/Cummings Publishing Company, Inc., 1994 which is hereby incorporated by reference in its entirety. For information on OLE Controls and COM interfaces, please see *Microsoft OLE Control Developer's Kit*, Microsoft Press, 1994 and Denning, *OLE Controls Inside Out: The Programmer's Guide to Building*

*Componentware with OLE and the Component Object Model*, Microsoft Press, 1995 which are hereby incorporated by reference in their entirety.

Figure 25:
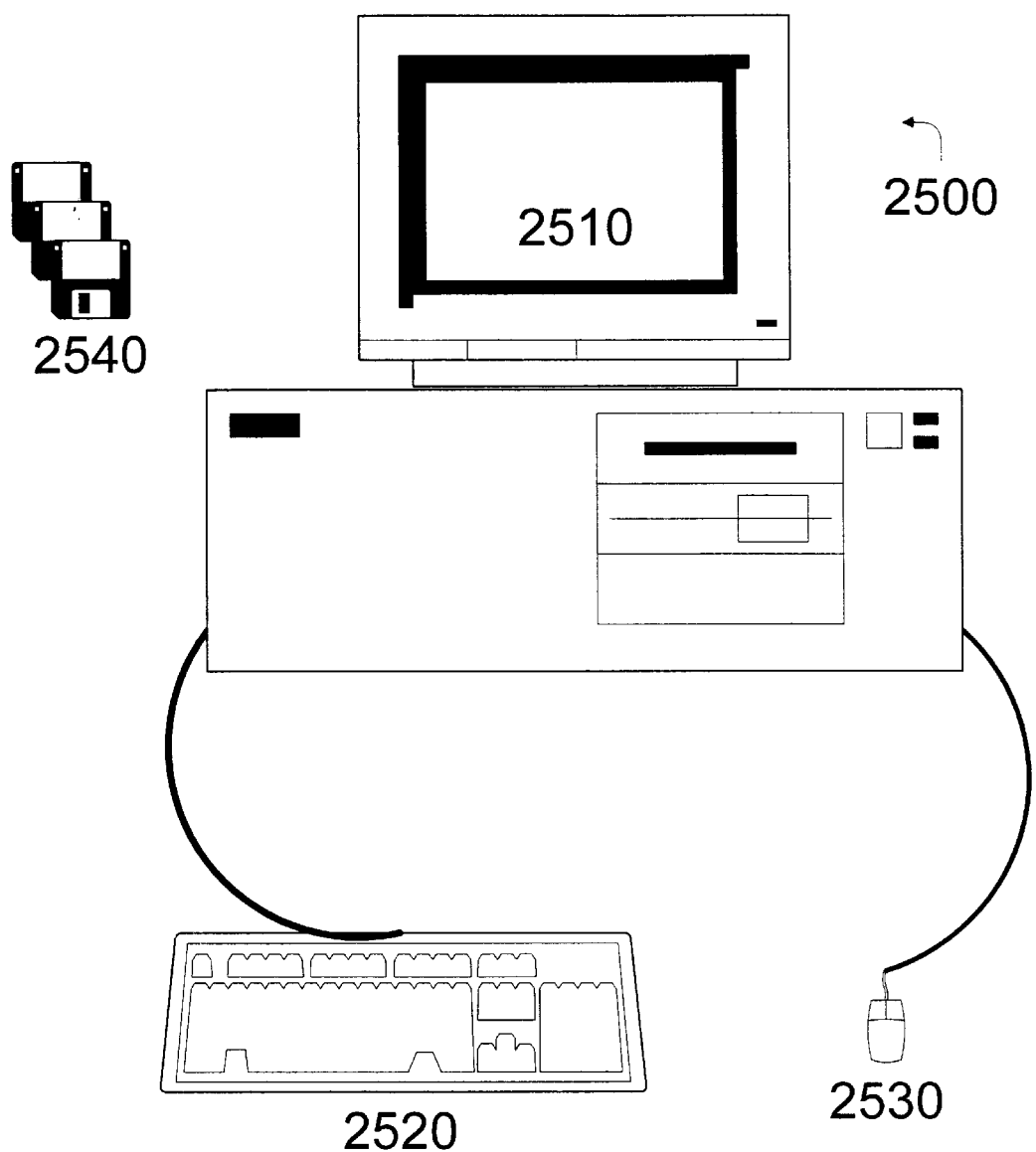
FIG. 25 is an illustrative computer system which is programmed according to the present invention and which operates according to the present invention.

Referring first to FIG. 25, an illustrative computer system 2500 which is programmed according to the present invention and which operates according to the present invention is shown. The computer system 2500 comprises a video display screen 2510, a keyboard 2520, and a mouse 2530 as shown. The computer system 2500 also includes various standard components, including at least one central processing unit (CPU), memory, a hard drive, one or more buses, and a power supply. The computer system preferably includes a memory media, such as magnetic media, or floppy disk(s) 2540, on which computer programs according to the present invention are stored. In the preferred embodiment, the present invention comprises a software program stored on the memory and/or hard drive of the computer 2500 and executed by the CPU. The CPU executing code and data from the memory thus comprises a means for executing the steps described below. The computer system 2500 may be used to create and/or edit controls according to the present invention, as described below.

Figure 5A:
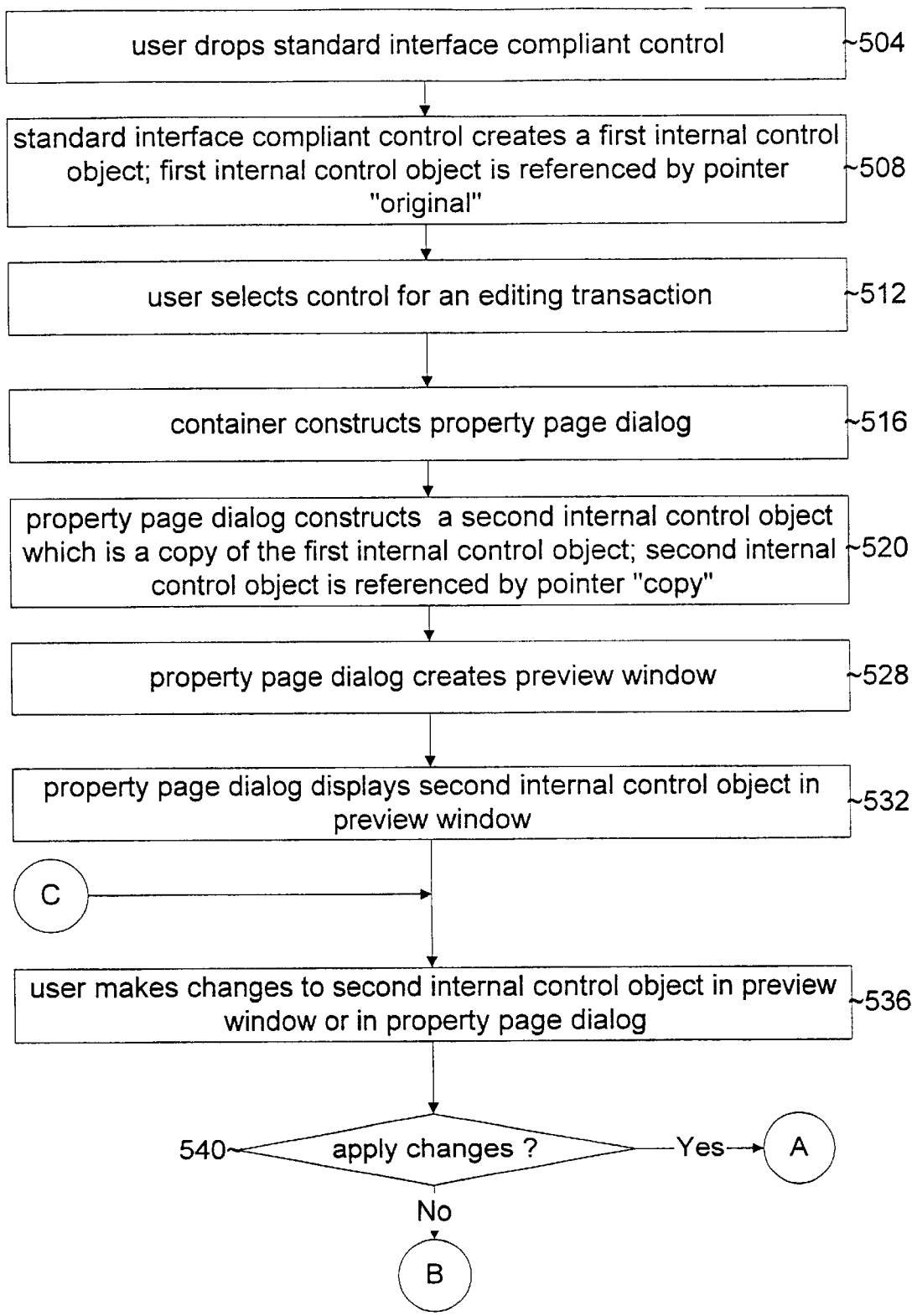
FIGS. 5A and 5B are a flowchart illustrating steps taken to edit a control according to the preferred embodiment of the present invention.
Figure 5B:
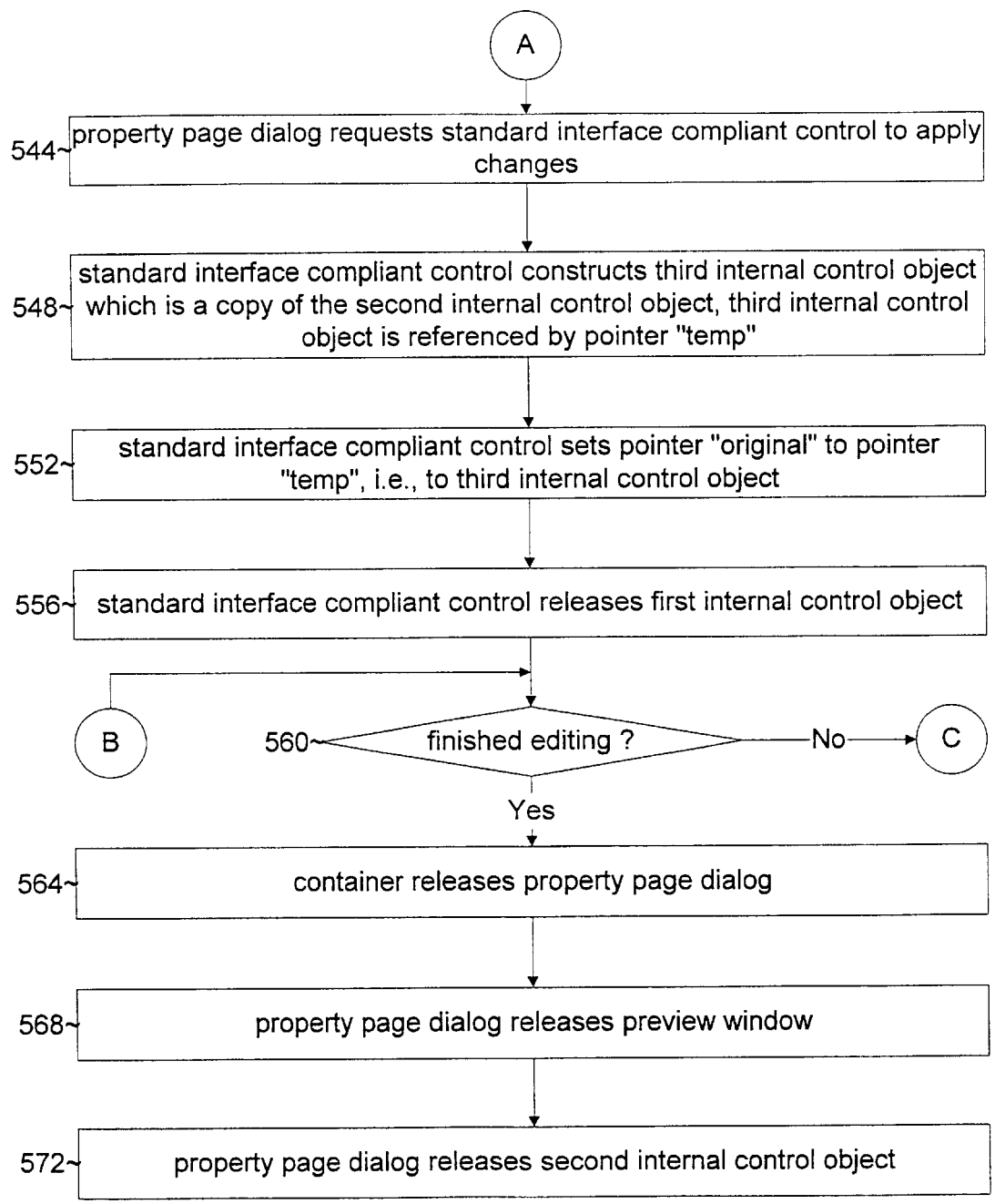

Referring now to FIGS. 5A and 5B, referred to collectively as FIG. 5, a flowchart illustrating steps performed to edit a control according to the preferred embodiment of the present invention is shown. A user drops a standard interface compliant control onto a window of a container in step 504. An example of the window is a Visual Basic form. The user typically is a software developer desiring to create an application employing a graphical user interface. The application thus developed, which was created and edited using the present invention, is then used by other users needing the application.

The standard control interface is preferably the interface defined by the Microsoft OLE Control Specification. Controls which conform to the OLE Control Specification are referred to as OLE controls, and are also referred to as Active X controls. The control dropped in step 504 is preferably embodied within the "NATIONAL INSTRUMENTS" "COMPONENTWORKS" Controls which are Active X controls. The ComponentWorks Controls are described herein being used by the Microsoft Visual Basic development environment container. However, the ComponentWorks controls described may be employed in, but not limited to, the following list of containers: Microsoft Visual FoxPro, Microsoft Access, Borland Delphi, Microsoft Visual C++, Borland C++, Microsoft Internet Explorer, Netscape Navigator, Microsoft Internet Developer Studio, National Instruments HiQ, and any other container which supports the OLE control specification.

Figure 1:
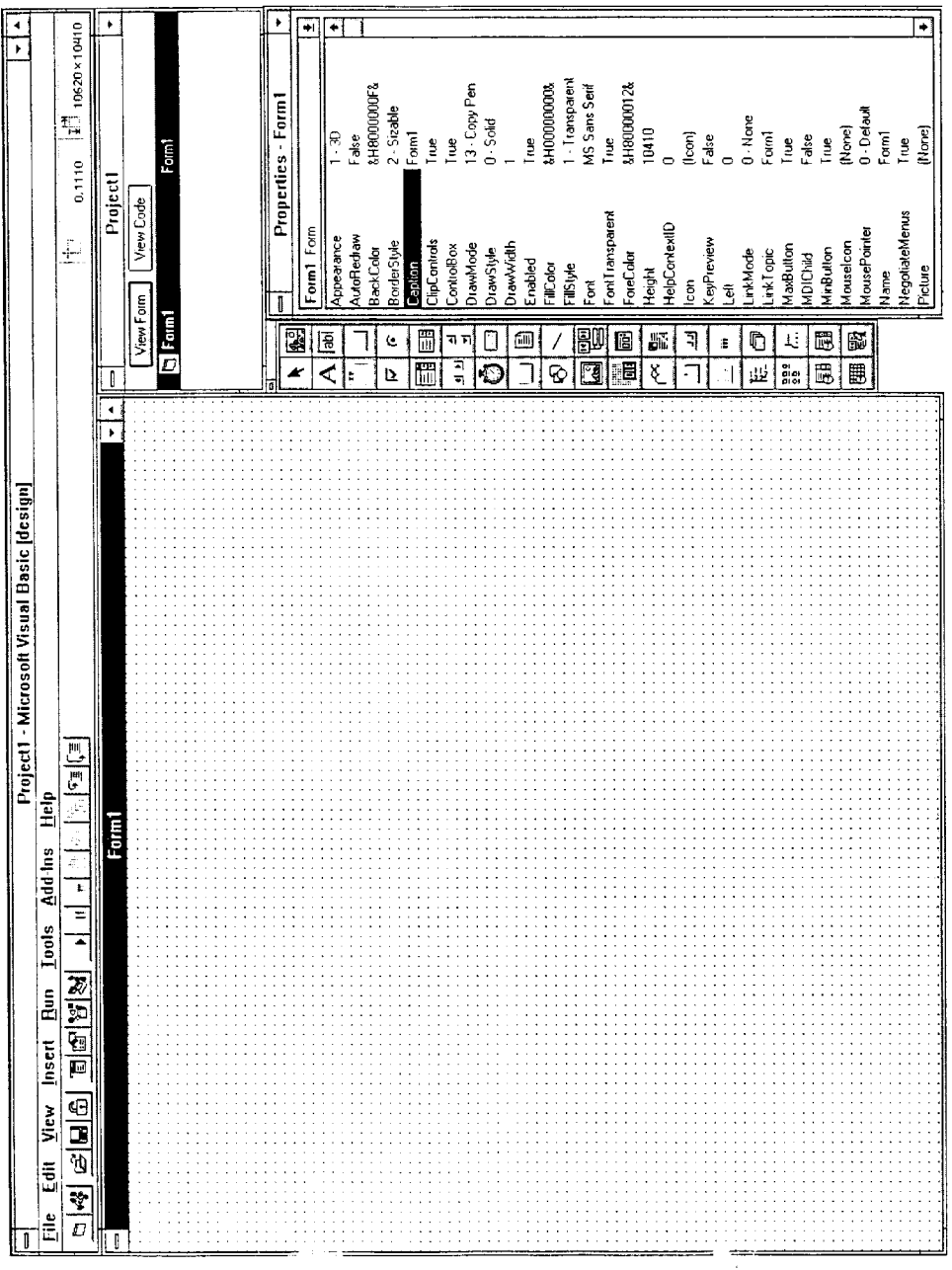
FIG. 1 is a screen shot of a Visual Basic 4.0 screen with a toolbar of icons of controls according to the prior art.
Figure 2:
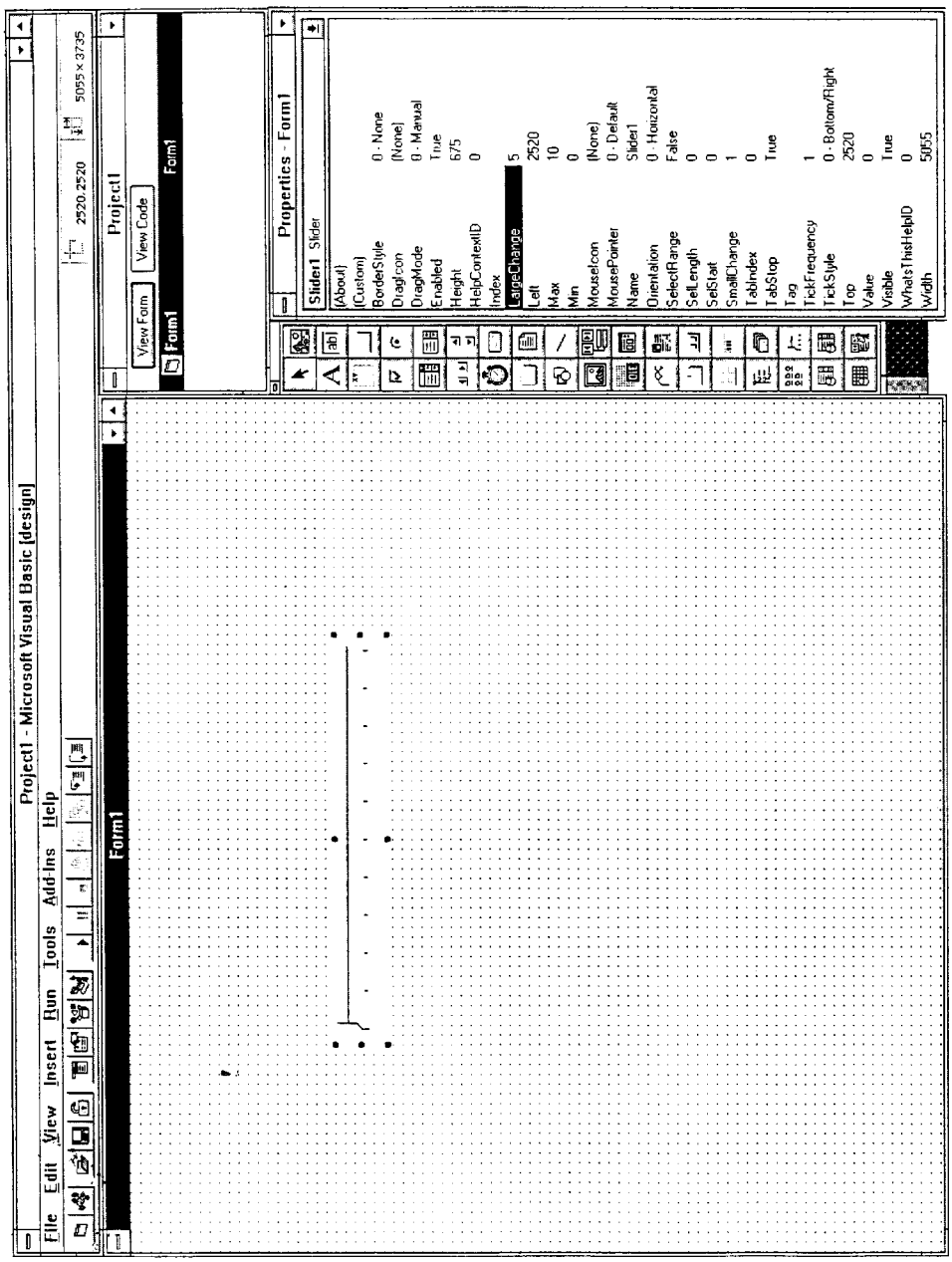
FIG. 2 is a screen shot showing a slider control from the toolbar of FIG. 1 according to the prior art.
Figure 3:
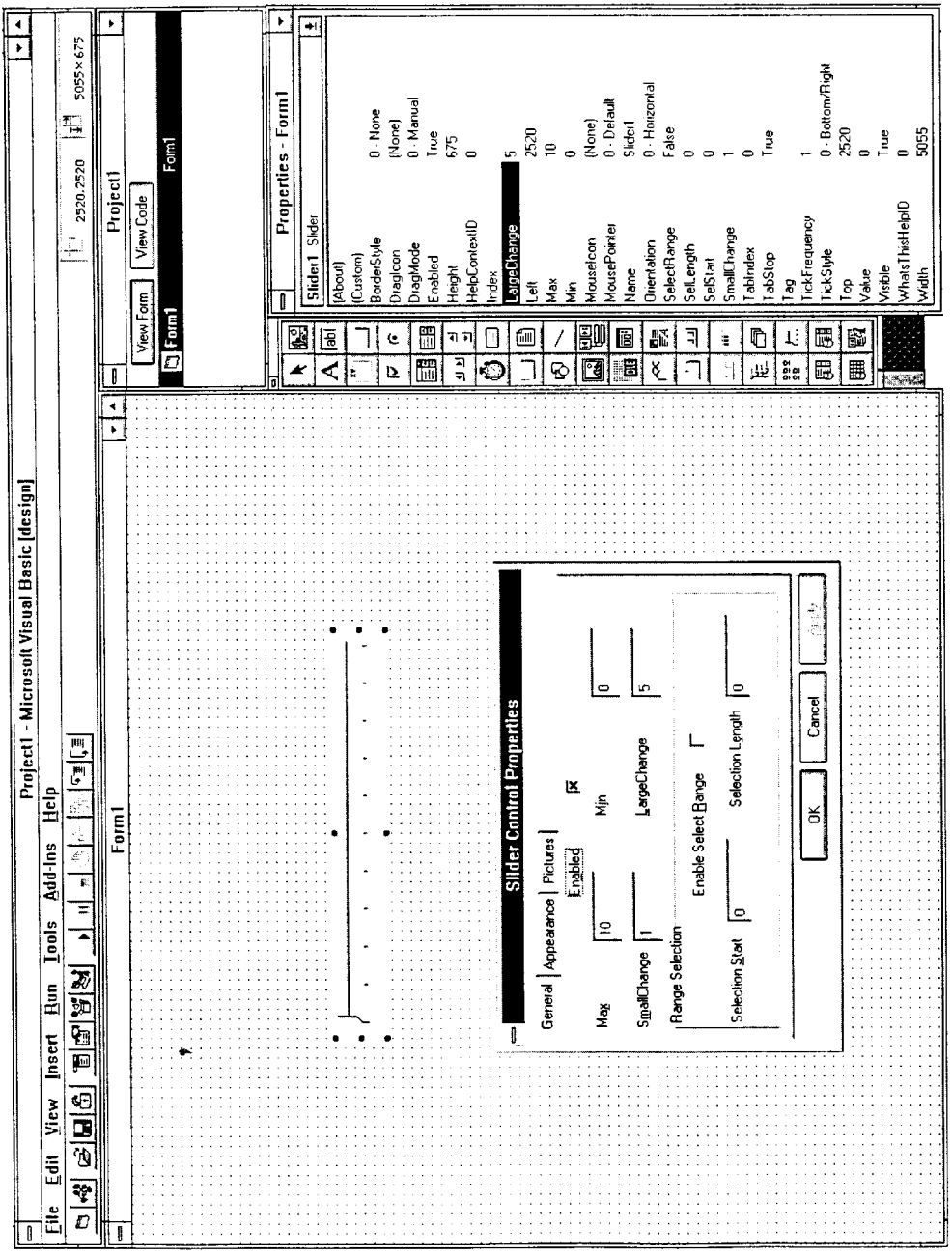
FIG. 3 is a screen shot showing the slider control of FIG. 2 property page dialog according to the prior art.
Figure 4:
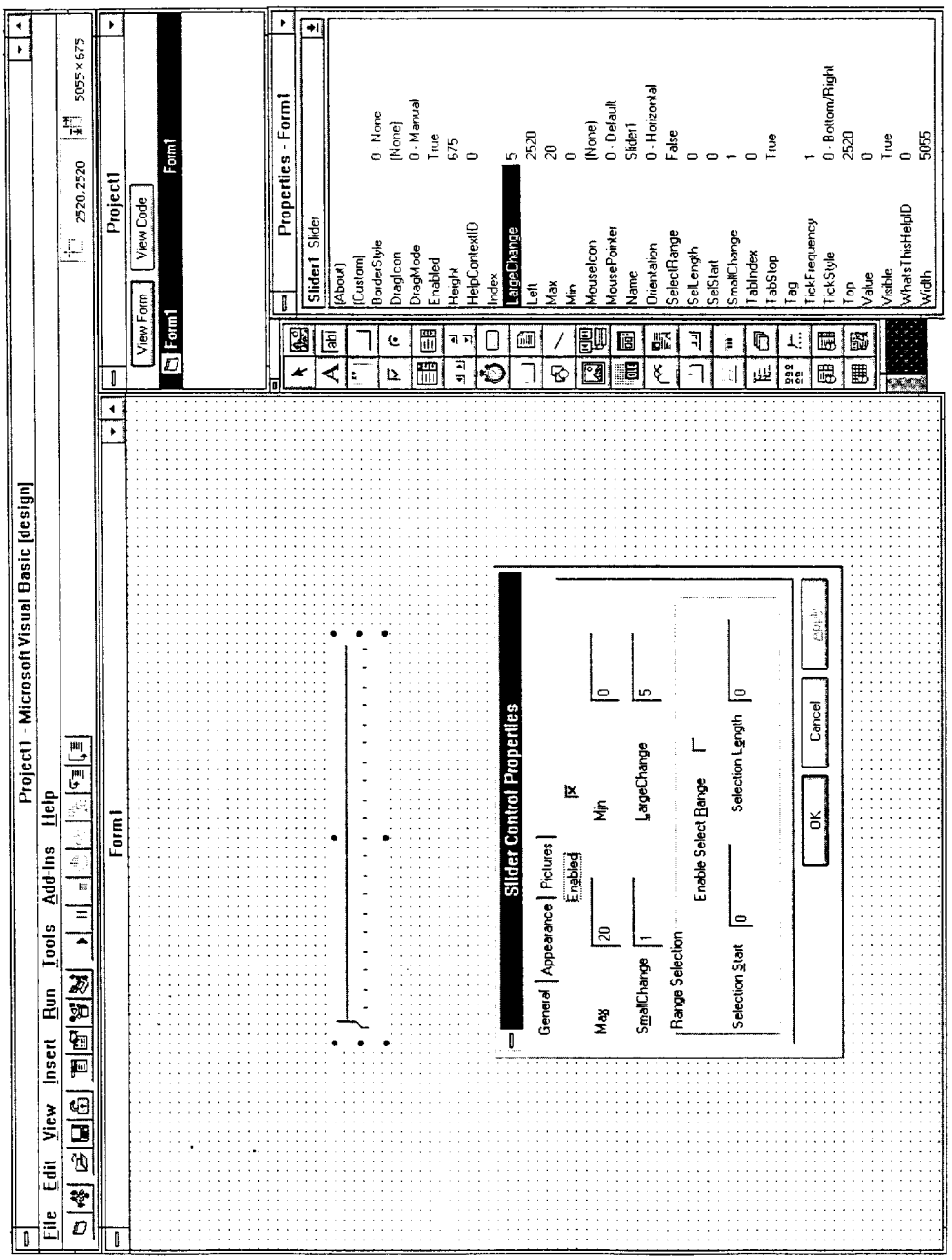
FIG. 4 is a screen shot showing the slider control of FIG. 3 being edited according to the prior art.
Figure 6:
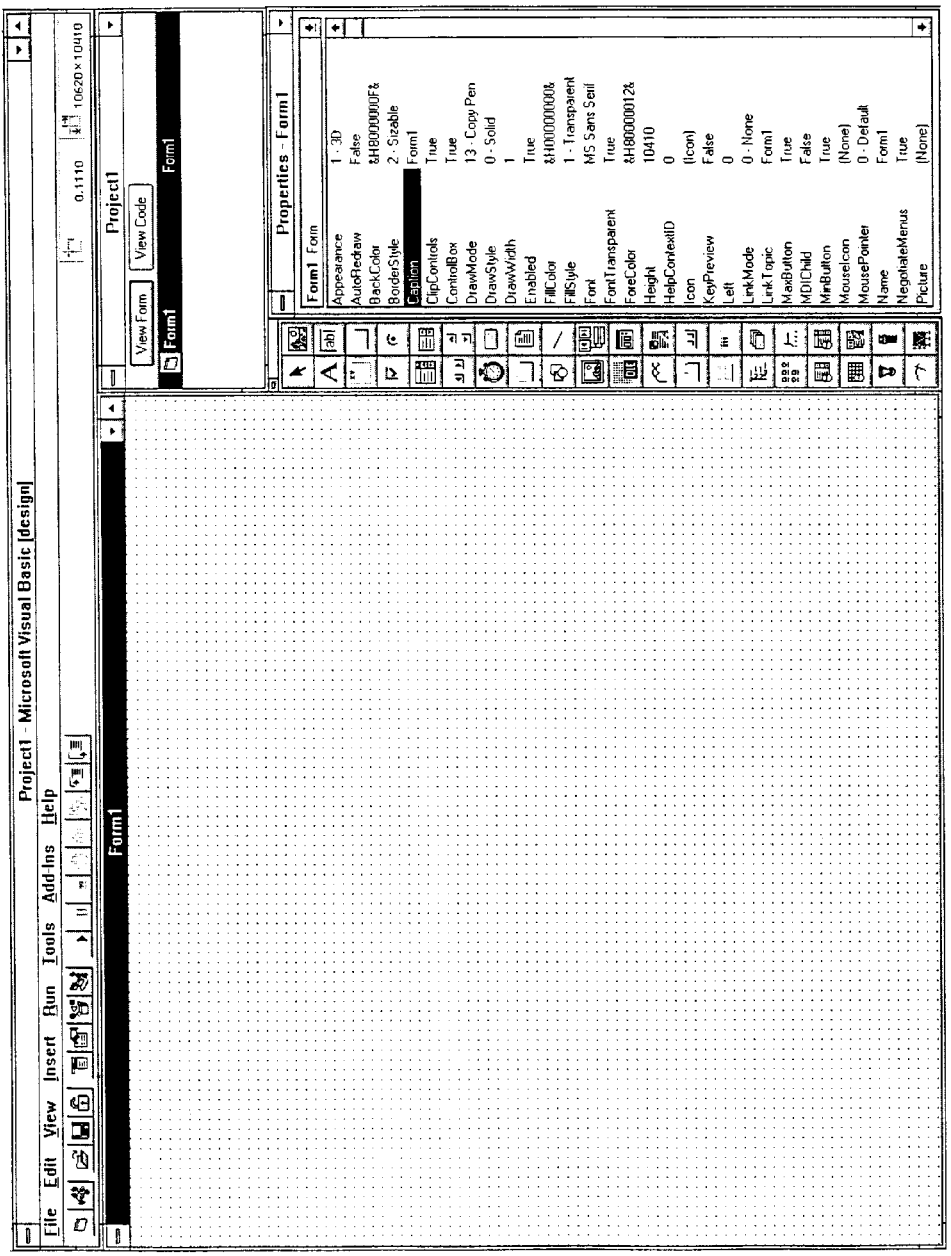
FIG. 6 is a screen shot of a Visual Basic 4.0 screen with a toolbar including icons of four new controls according to the preferred embodiment of the present invention in the toolbar in addition to those controls shown in FIG. 1.

Referring now to FIG. 6, a screen shot of a Visual Basic 4.0 screen is shown with a toolbar including icons of four new controls in the toolbar in addition to those controls shown in the toolbar of FIG. 1. The new controls are ComponentWorks controls, namely a slider, a graph, a meter, and a knob. The slider control is referred to as CWSlide.

Figure 7:
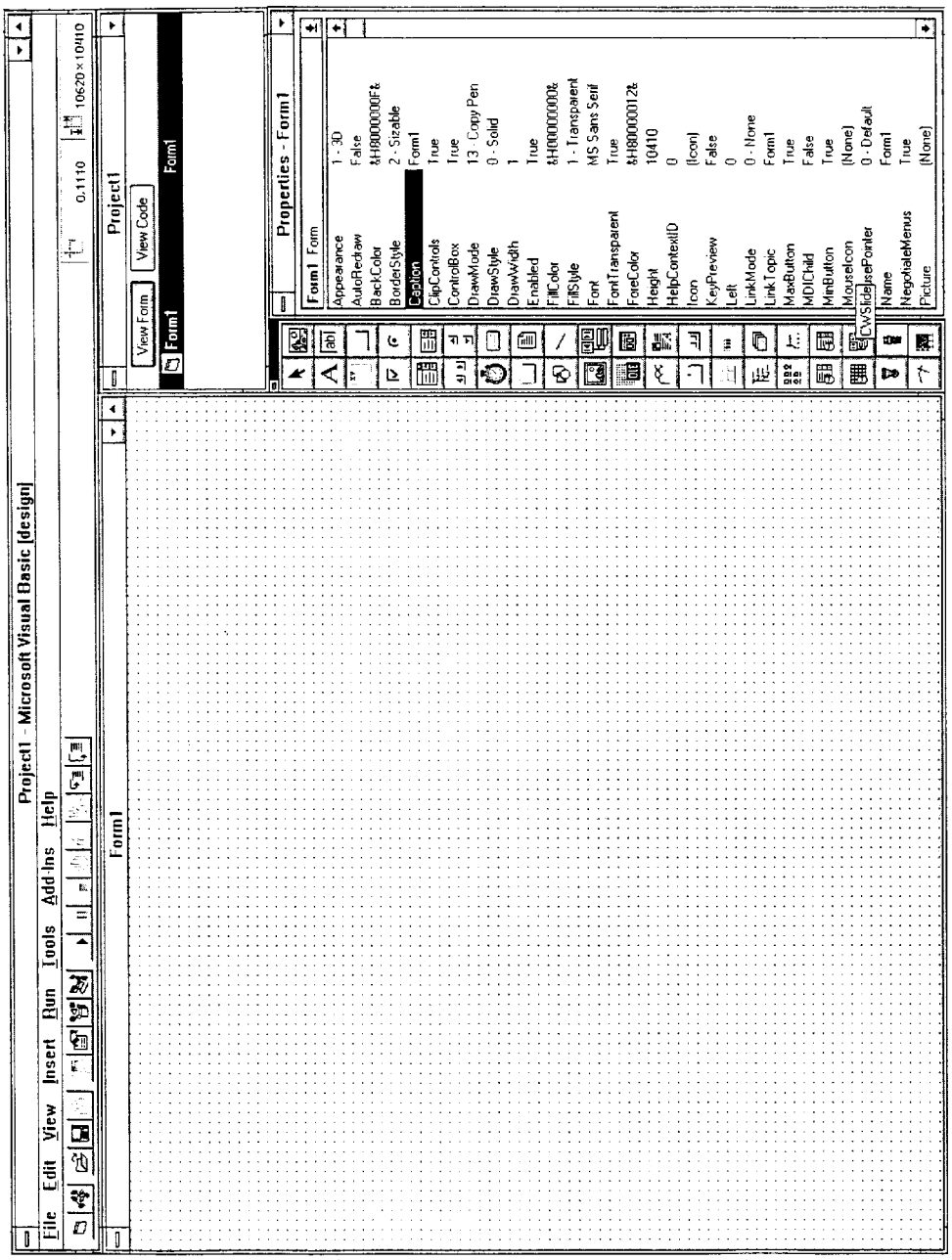
FIG. 7 is a screen shot in which the CWSlide control icon according to the present invention is selected for dropping onto a form.

The commonly used term "drop" is meant to encompass the placing of the control on the form, typically by clicking a mouse on the icon of the control in a toolbox, dragging the control from the toolbox to the form via the mouse and then releasing the mouse button to "drop" the control on the form. However, the present invention is not intended to be limited with respect to other manners of placing the control. FIG. 7 shows the CWSlide control of FIG. 6 having been selected for dragging and dropping onto the form.

The ComponentWorks Controls are preferably implemented in the C++ language using object oriented programming techniques. The accompanying microfiche appendix provides a partial C++ source code listing of the ComponentWorks Controls. The controls are implemented as objects and as such have associated properties, methods and events. The control objects have associated constructors and destructors. A constructor is a method of a class which instantiates, or creates, an object of the class and/or initializes the state of the object. Common operations of the constructor include allocating memory for the object and invoking functions upon creation of the object which need to be performed at the time of the creation of the object. The terms construct, create and instantiate have substantially the same meaning in the context of this disclosure. A destructor is a method that frees the state of an object and/or destroys the object itself. A destructor then, serves essentially the opposite function of a constructor. C++ provides the "new" operator to create an object and the "delete" operator to destroy an object. Objects and their common operations such as properties, methods, events, creation, and destruction are well known in the art of object oriented programming.

The control is composed of two parts: an OLE standard interface compliant control portion and an internal control objects portion. The internal control objects contain the "meat" of the control in that the internal control objects encompass most of the data associated with the control. The internal control object is not necessarily compliant with the OLE control specification. The standard interface compliant control is visible to and interacts with the container, in this case Visual Basic, through the interface defined by the OLE Control Specification. The standard interface compliant control also maintains references to and interacts with the internal control objects.

The major role of the standard interface compliant control is to act as a liaison between the container and the internal control objects. The standard interface compliant control is a "light-weight" object, in that the bulk of its purpose is to redirect invocations of methods and events on itself to corresponding method and events on the internal control objects. The standard interface compliant control may be conceptualized as a wrapper around the internal control objects which allows the container to interact with the internal control objects, albeit indirectly through the standard interface compliant control. This level of indirection enables the controls to advantageously provide the novel editing method described herein.

Referring again to FIG. 5, when the user drops the control, the container instantiates, i.e., creates or constructs, an object of the class defining the standard interface compliant control. Objects being instances of a class is well known in the art of object oriented programming. The standard interface compliant control comprises three pointers to internal control objects: an original pointer, a copy pointer and a temp pointer. When the standard interface compliant control object is instantiated, the constructor for the standard interface compliant control creates a first internal control object and sets the original pointer to the first internal control object in step 508. Whenever a method is invoked on the standard interface compliant control, the standard interface compliant control redirects the invocation by invoking the corresponding method on the internal control object pointed to by the original pointer, which at this point in time is the first internal control object. The redirection is transparent to the container, which is unaware of the redirection.

After instantiating the standard interface compliant control object, the container invokes a method on the control to display the control on the container form. The standard interface compliant control redirects the method invocation by in turn invoking the corresponding display method on the first internal control object. The user may subsequently drop other controls onto the form to create the desired user interface.

Figure 8:
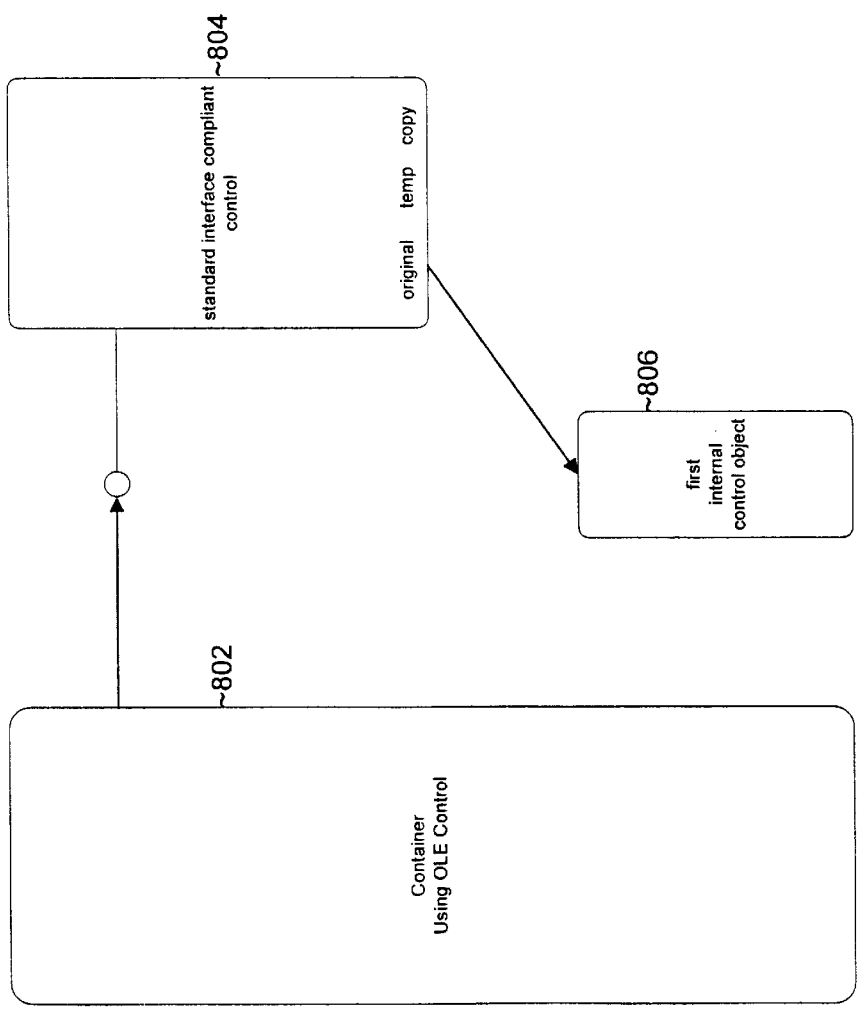
FIG. 8 is a block diagram illustrating the relationship between objects when an container drops a control according to the preferred embodiment of the present invention.

Referring now to FIG. 8, a block diagram illustrating the relationship between objects when the container drops the control according to the preferred embodiment of the present invention is shown. The container 802 instantiates the standard interface compliant control 804 as described in step 504. The container 802 is illustrative of one of the containers mentioned previously, such as Microsoft Visual Basic. The container 802 creates the standard interface compliant control 804. The standard interface compliant control 804 creates the first internal control object 806 and references the first internal control object 806 via the original pointer as described in step 508.

The container, or client, communicates with the standard interface compliant control, which acts as a server, through Component Object Model (COM) interfaces, which are defined by Microsoft. A COM interface is a set of functions or methods which a client may invoke on a server. The OLE Control interface is comprised of COM interfaces which are described in the Microsoft OLE Control Specification previously incorporated by reference. The drawing symbol for a COM interface comprises a line with an arrowhead connected to a line with an open circle. In FIG. 8, for example, the container 802 and the standard interface compliant control 804 are shown associated by a COM interface. More than one COM interface may be present between the container 802 and the standard interface compliant control 804 and these additional COM interfaces may exist in either direction.

The internal control objects themselves may aggregate other internal control objects. For example, a two-dimensional graph internal control object may aggregate two axis internal control objects, a plot internal control object, a cursor internal control object, etc.

Figure 9:
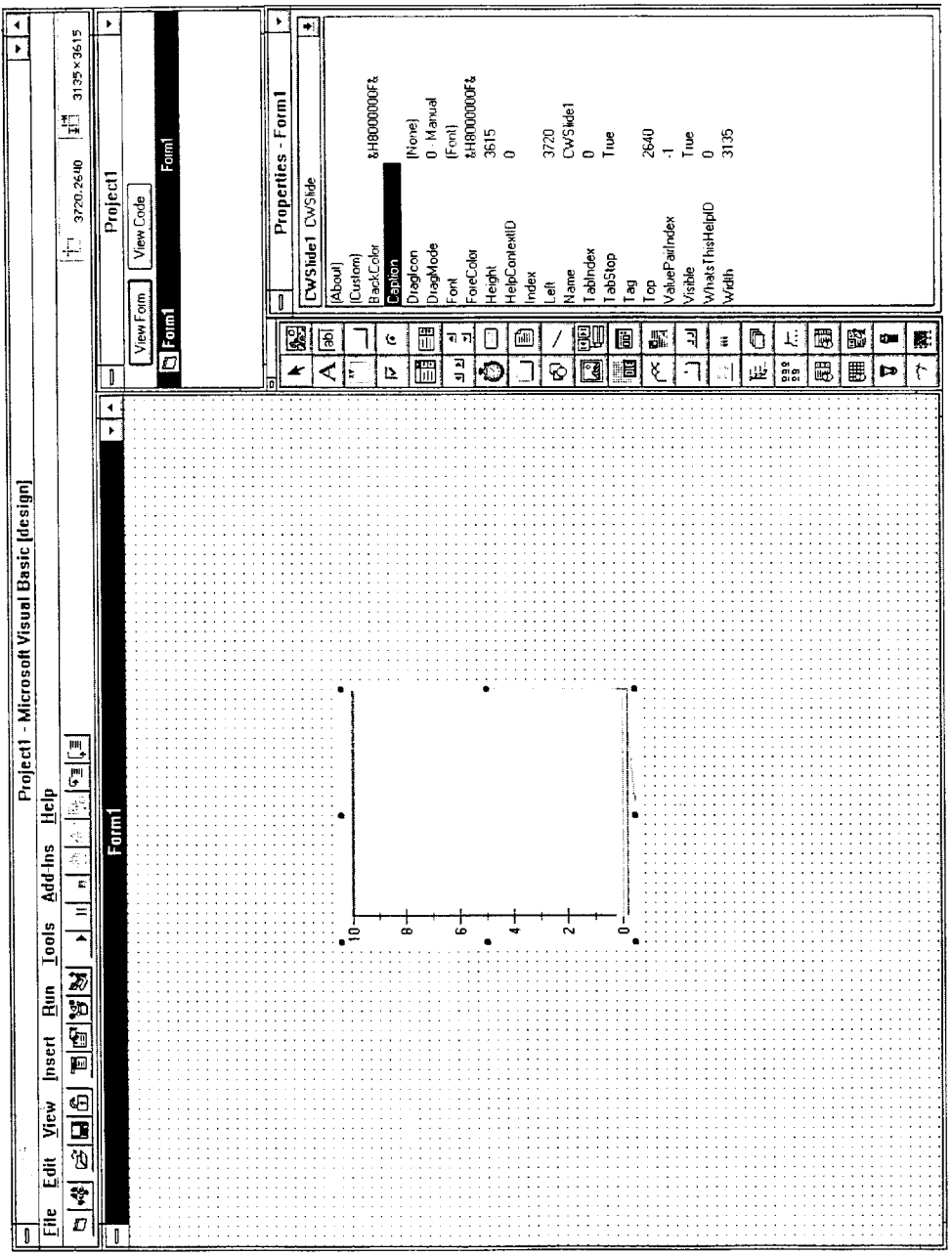
FIG. 9 is a screen shot showing the CWSlide control having been dropped onto a form.

Referring now to FIG. 9, a screen shot shows the control of FIG. 7 having been dropped onto a form.

Figure 10:
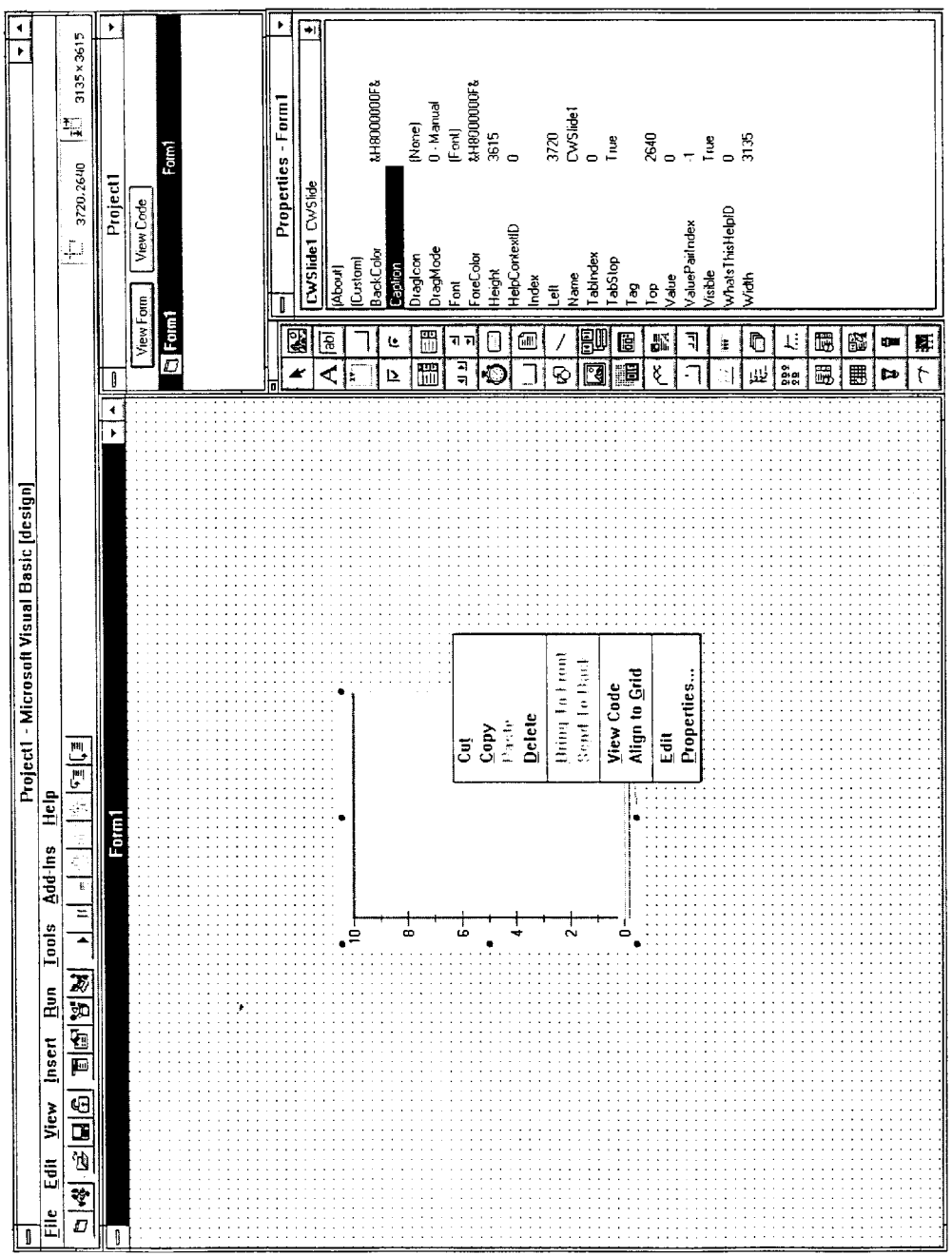
FIG. 10 is a screen shot showing the CWSlide control being selected for an editing transaction.
Figure 11:
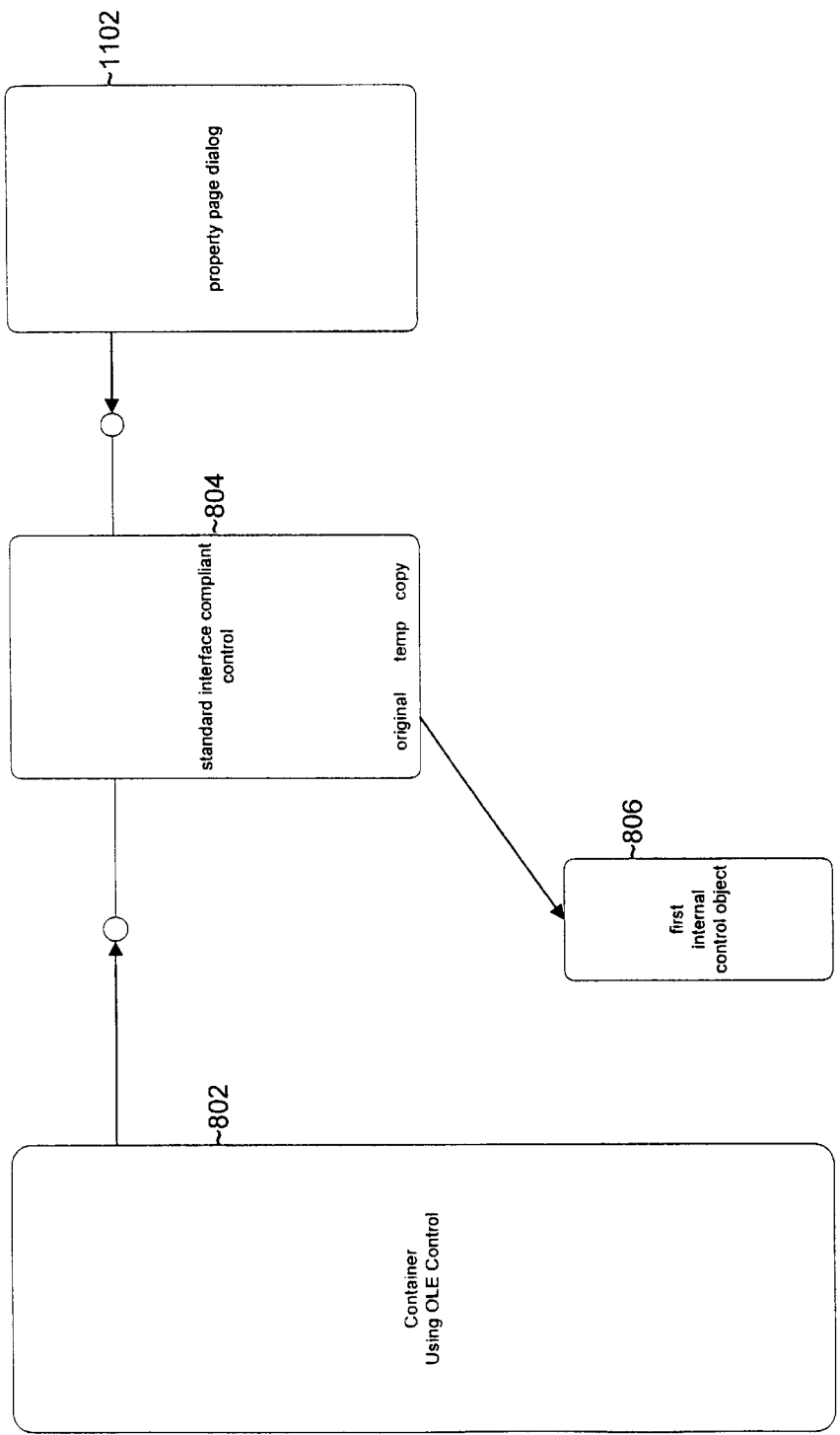
FIG. 11 is a block diagram illustrating the relationship between objects when the control of FIG. 8 creates a property page dialog.

Referring again to FIG. 5, after dropping the control, the user selects the control for an editing transaction in step 512. In the Visual Basic container, the user selects the control for editing by right clicking on the control with the mouse and choosing the "Properties" menu selection as shown in FIG. 10. The container invokes a method on the standard interface compliant control to create a property page dialog in step 516. The property page dialog is also an object. The standard interface compliant control creates the property page dialog and displays the property page dialog in a separate window for the property page dialog. FIG. 11 illustrates the relationship between the standard interface compliant control 804 and the property page dialog 1102 created in step 516. The property page dialog 1102 communicates with the standard interface compliant control 804 via a COM interface.

Referring again to FIG. 5, the property page dialog constructor constructs a second internal control object which is a copy of the first internal control object in step 520 by invoking a method on the standard interface compliant control. The second internal control object is referenced by the copy pointer of the standard interface compliant control. The property page dialog constructor also creates a preview window in step 528 and displays the second internal control object in the preview window in step 532.

Figure 12:
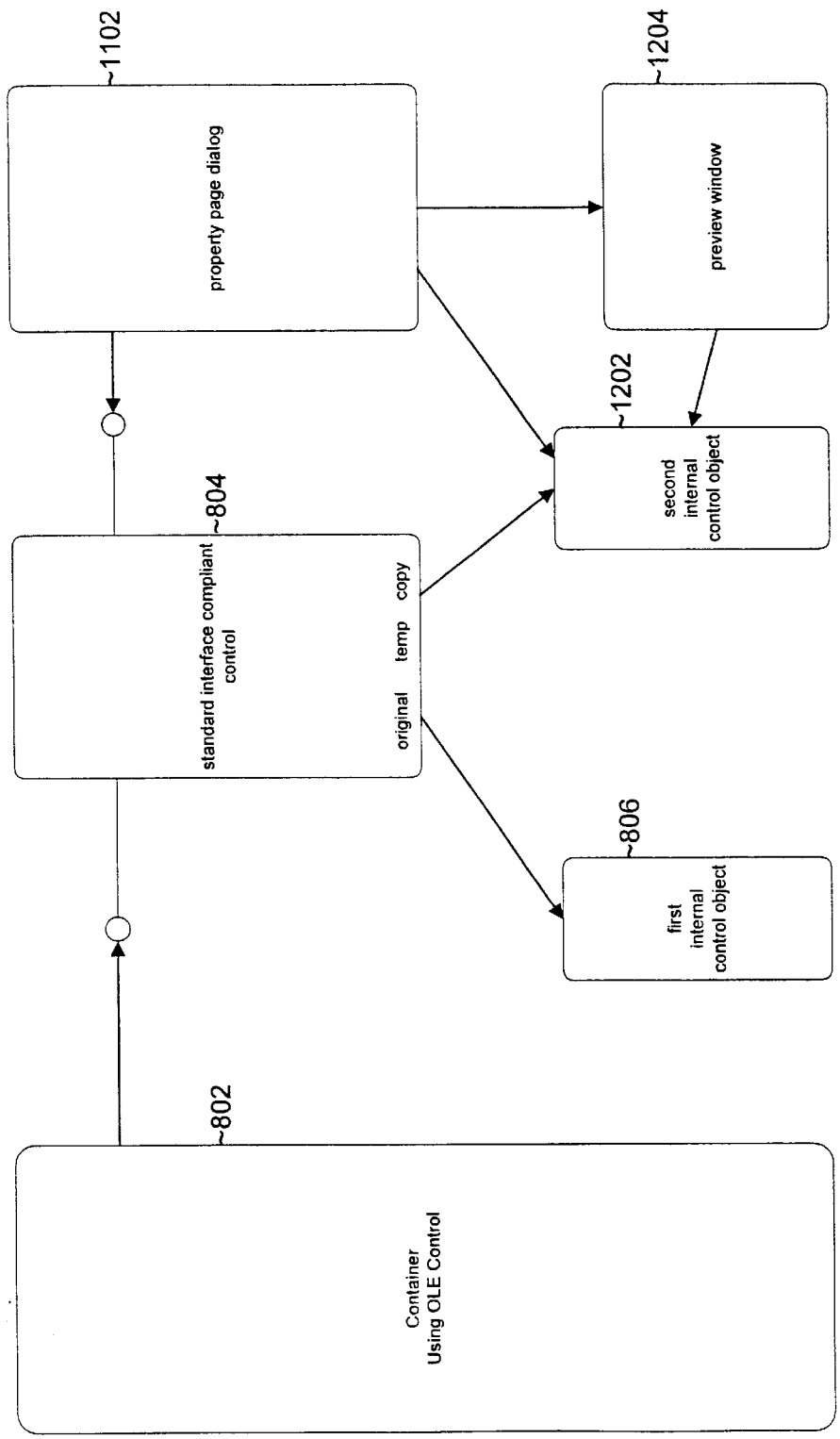
FIG. 12 is a block diagram illustrating the relationship between objects when the control of FIG. 11 creates a second internal control object which is a copy of the first internal control object and creates a preview window.

Referring now to FIG. 12, a block diagram illustrating the relationship between the standard interface compliant control 804, the property page dialog 1102, the second internal control object 1202 created in step 520, which is a copy of the first internal control object, and the preview window 1204, created in step 528 is shown. The standard interface compliant control 804 copy pointer references the second internal control object 1202. The property page dialog 1102 and preview window 1204 also reference the second internal control object 1202. Additionally, the property page dialog references the preview window 1204.

Figure 13:
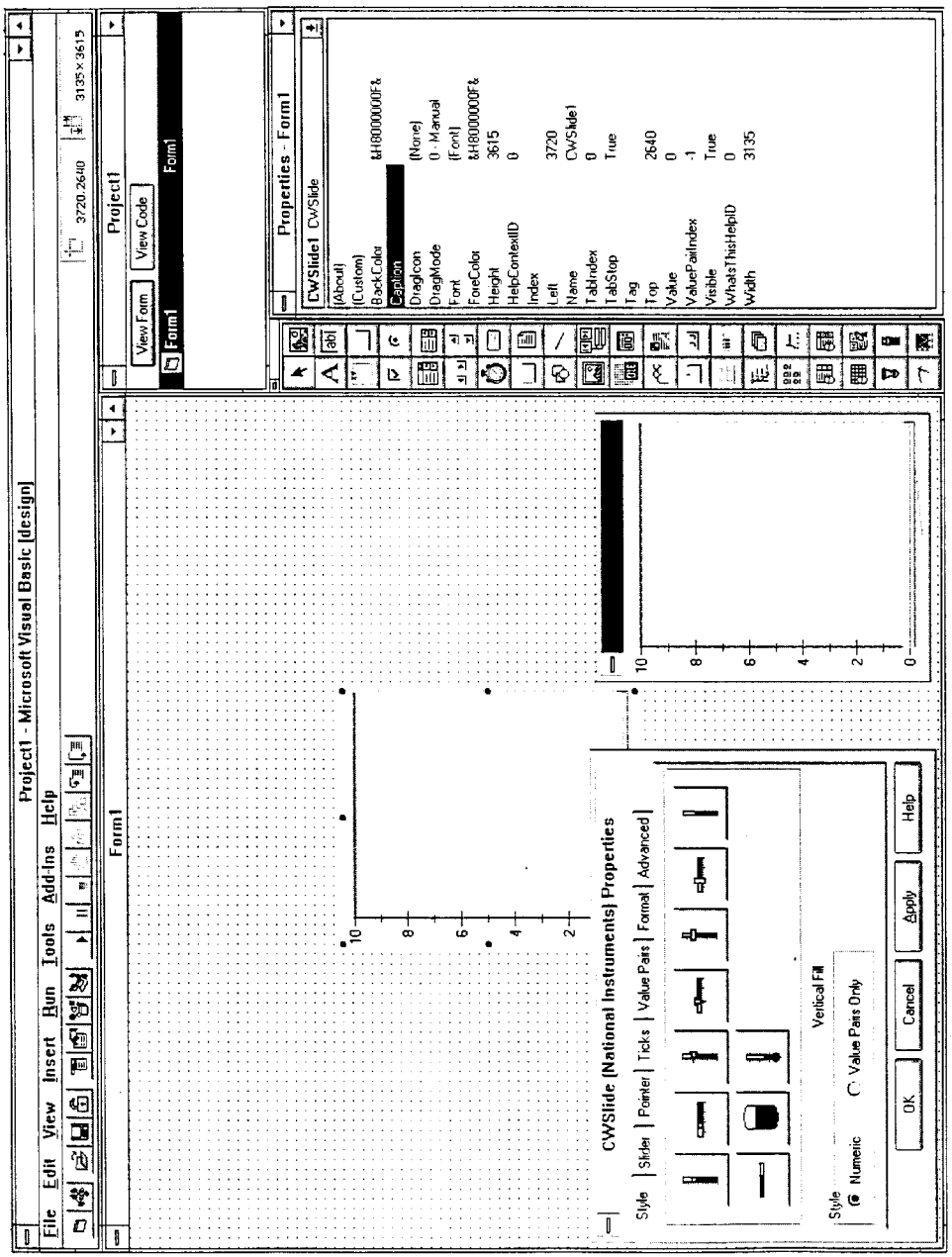
FIG. 13 is a screen shot of the property page dialog and preview window of the control of FIG. 10.

Referring now to FIG. 13, a screen shot shows the property page dialog, the preview window, and the second internal control object displayed in the preview window.

Referring again to FIG. 5, the user makes changes to the copy of the control, i.e., to the second internal control object, displayed in the preview window in step 536. The user may make changes in one of two ways: either by directly graphically interacting with the control in the preview window (as will be discussed in FIG. 18); or, by making changes via the property page dialog.

When the user makes changes to the second internal control object via the property page dialog or preview window, the property page or preview window, having a reference to the second internal control object, makes changes directly to the second internal control object either by modifying member variables of the object or invoking methods on the object.

Figure 14:
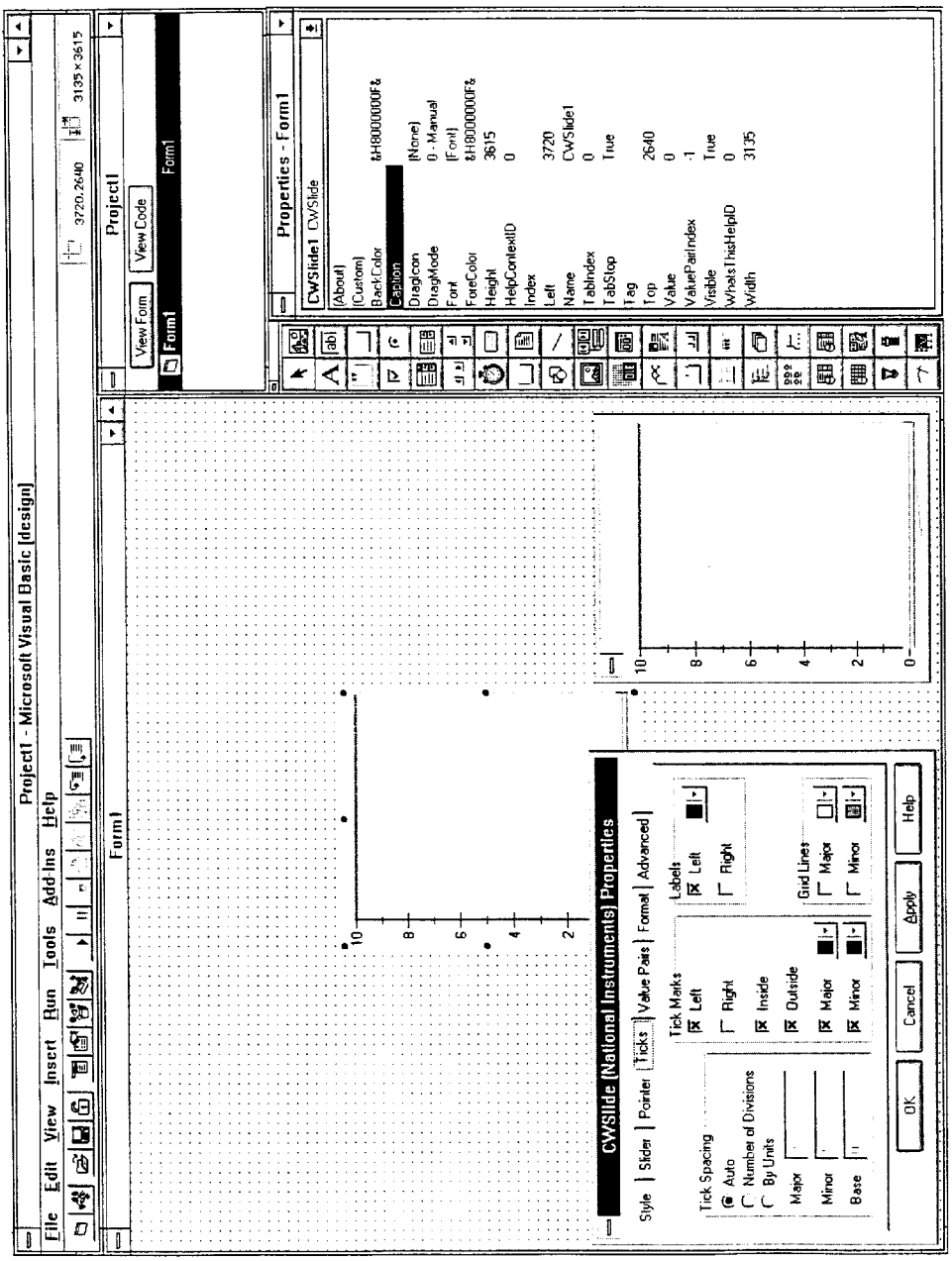
FIG. 14 is a screen shot of the "Ticks" menu in the property page dialog of FIG. 13.
Figure 15:
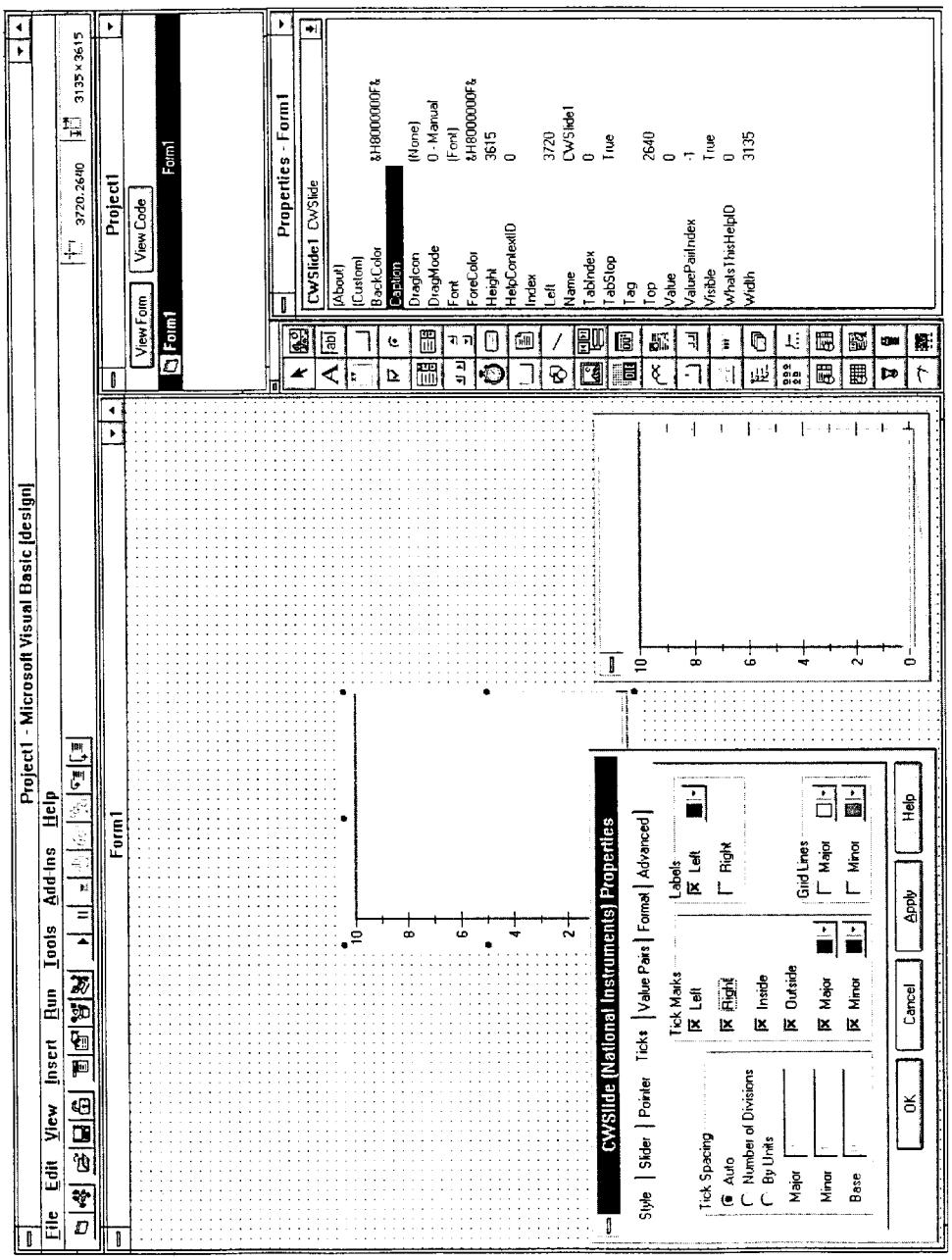
FIG. 15 is a screen shot of the control of FIG. 14 having had the right-hand tick marks enabled via the "Right" Tick Marks check box with the change being reflected in the second internal control object of the preview window.
Figure 16:
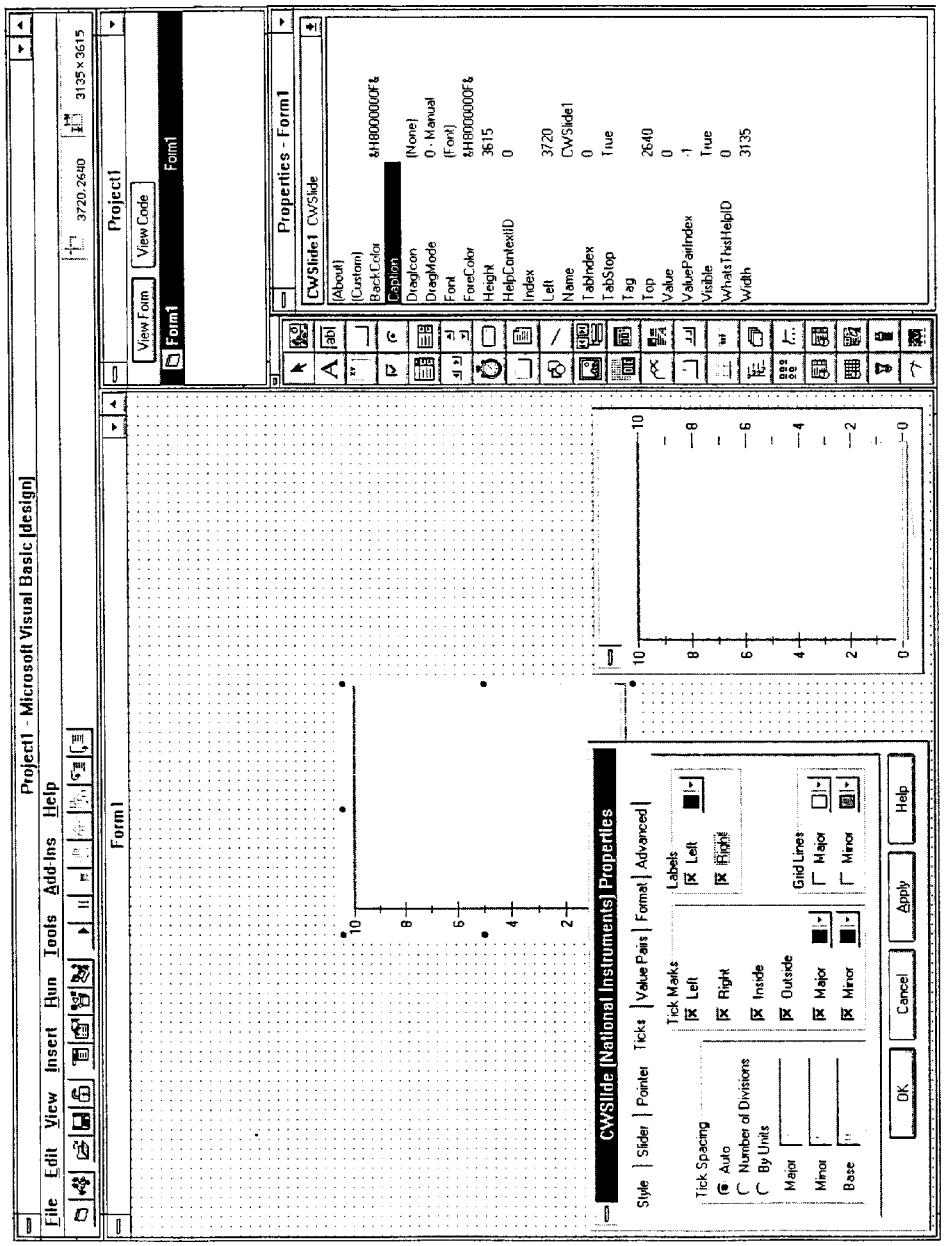
FIG. 16 is a screen shot of the control of FIG. 15 having had the right-hand tick mark labels enabled via the "Right" Labels check box with the change being reflected in the second internal control object of the preview window.
Figure 17:
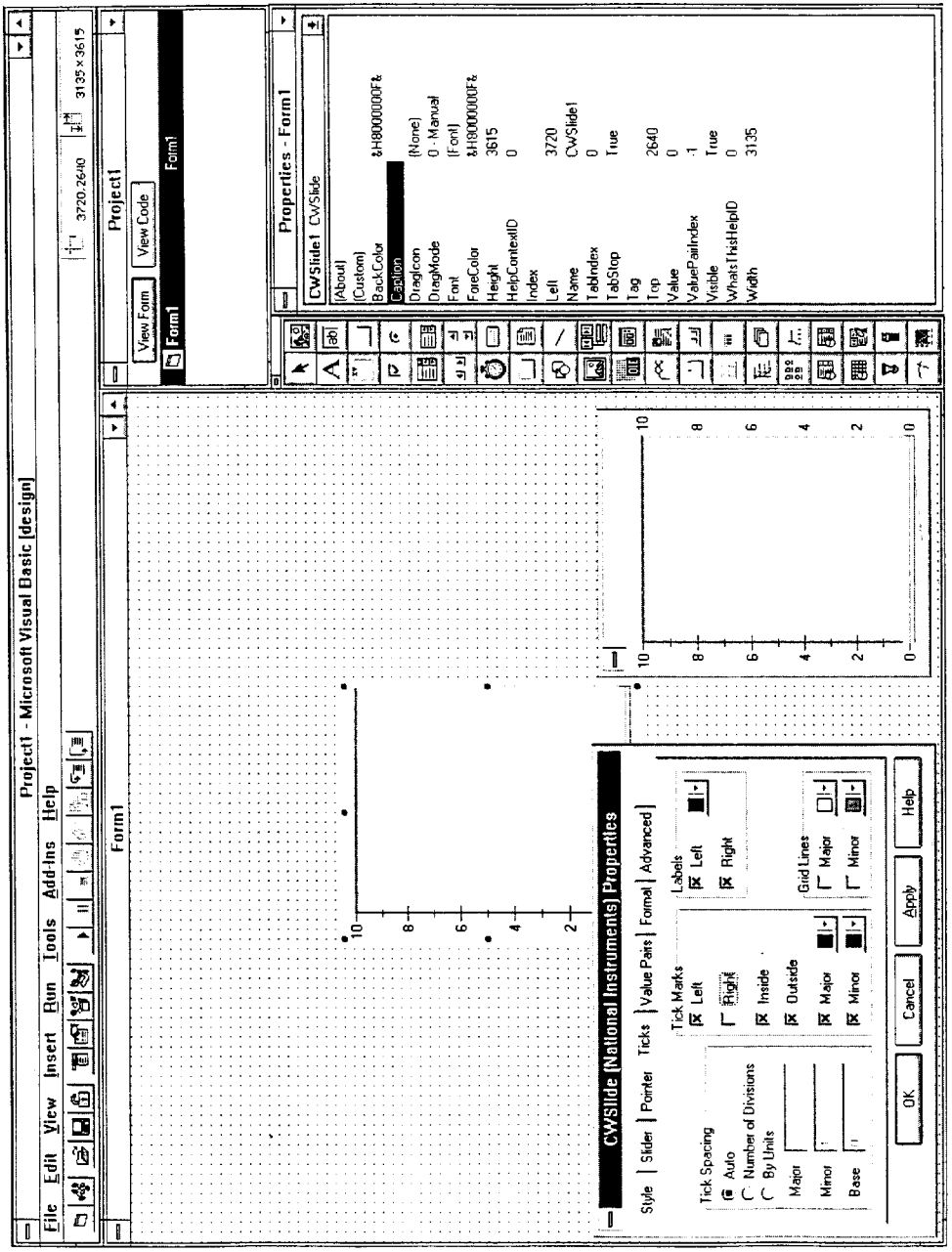
FIG. 17 is a screen shot of the control of FIG. 16 having had the right-hand tick marks disabled via the "Right" Tick Marks check box with the change being reflected in the second internal control object of the preview window, that is, the change made in FIG. 15 was backed out.

Referring now to FIG. 14, the "Ticks" menu in the property page dialog of FIG. 13 is shown. The user uses the property page dialog to make three changes as displayed in FIGS. 15 through 17. FIG. 15 shows the user having enabled the right-hand tick marks via the "Right" Tick Marks check box. The control in the preview window reflects the change. FIG. 16 shows the user having enabled the right-hand tick mark labels via the "Right" Labels check box with the change being reflected in the second internal control object of the preview window. FIG. 17 shows the user having disabled the right-hand tick marks via the "Right" Tick Marks check box, that is, the change made in FIG. 15 was backed out. The change is reflected in the second internal control object of the preview window.

Figure 18:
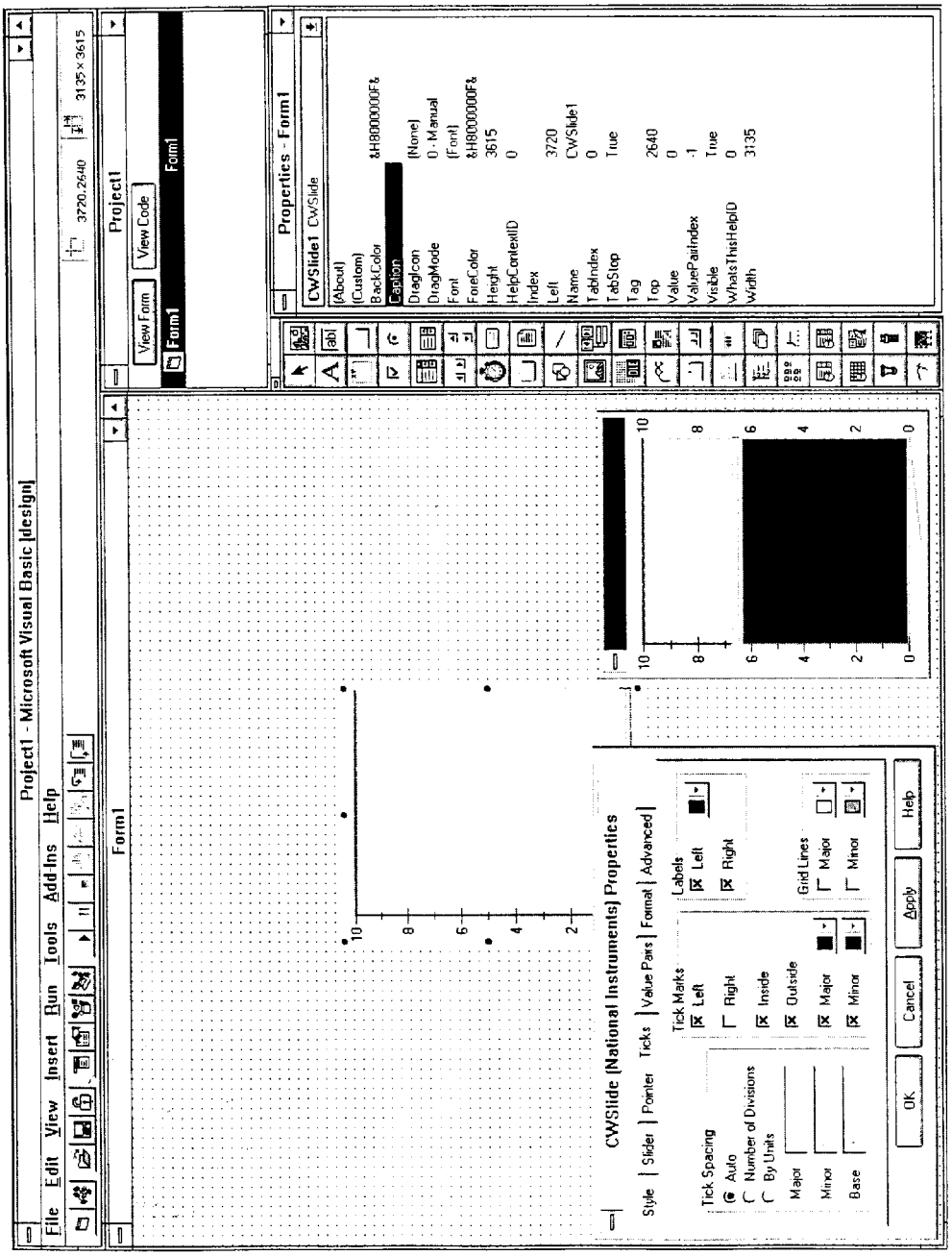
FIG. 18 is a screen shot showing the slider bar of the control of FIG. 17 having been moved from 0 to about 6.2 via direct graphical interaction with the control in the preview window.

Referring now to FIG. 18, a screen shot shows the results of direct graphical interaction with the control of FIG. 17. The slider bar has been moved from 0 to about 6.2 via a mouse drag operation on the control in the preview window. Thus, the present invention advantageously gives the user the ability to manipulate some or all of the properties of the control through graphical interaction with the second internal control object presented in the preview window. This feature of the invention advantageously provides "run-time-like" editing of the control but at design time.

The presentation of the second internal control object, i.e., a copy of the original control, in a separate preview window of the present invention advantageously allows the user to immediately see the effects of the changes made to the control. Thus the user is afforded the opportunity to edit the control to have the desired properties without altering the state of the original control. Likewise, the user is allowed to discard the changes if undesirable, that is, to easily and instantaneously back out any changes made prior to applying the changes. This transaction mechanism is superior to other editing mechanisms in which any changes made are immediately applied to the control in that with the other mechanisms it may be difficult to remember and back out undesirable changes.

The advantages of the present invention pointed out above are in large part made possible by the advantageous structure of the standard interface compliant control and the internal control objects. This structure advantageously allows the control to make a copy of itself for editing (i.e., the second internal control object), monitor changes made to the copy, and discard the copy or apply all changes made to the copy.

Referring again to FIG. 5, in step 540 the user decides to apply or cancel the changes which were made during step 536. If the user chooses to apply the changes, the property page dialog invokes a method on the standard interface compliant control to apply the changes in step 544. In response to the method invocation by the property page dialog, the standard interface compliant control creates a third internal control object which is a copy of the second internal control object and assigns the temp pointer to the third internal control object in step 548. It should be noted that since the third internal control object is a copy of the second internal control object, the third internal control object incorporates all the changes made by the user to the second internal control object in step 536.

Figure 19:
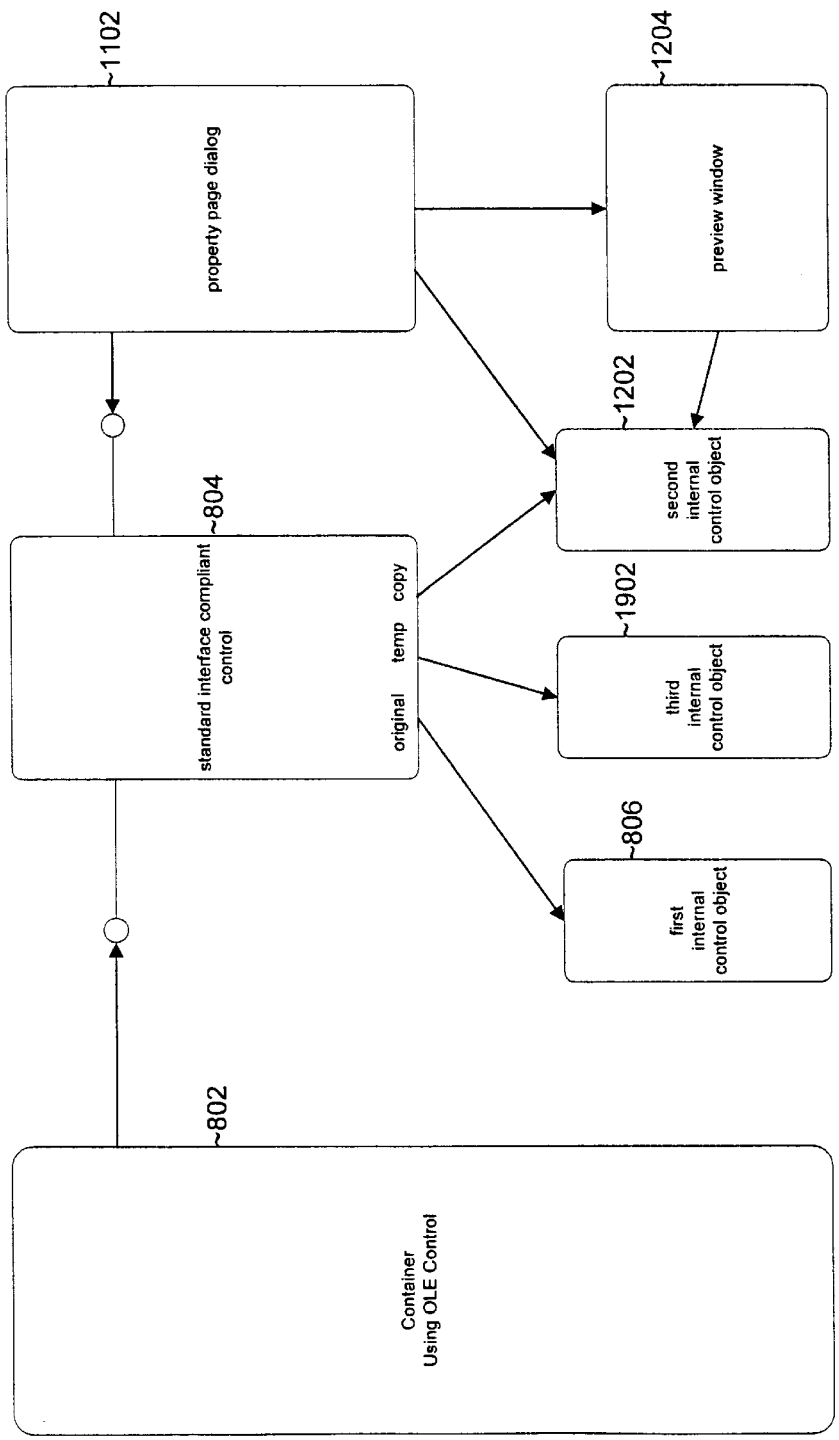
FIG. 19 is a block diagram illustrating the relationship between objects when the control of FIG. 12 creates a third internal control object in response to changes made by a user being applied.

Referring now to FIG. 19, a block diagram illustrating the relationship between the third internal control object 1902 created in step 548 and the other objects of FIG. 12 is shown. The standard interface compliant control 804 references the third internal control object 1902 via the temp pointer.

Referring again to FIG. 5, once the standard interface compliant control successfully creates the third internal control object in response to the invocation of the method by the property page dialog to apply the changes, the standard interface compliant control sets the original pointer to the temp pointer, and hence, to the third internal control object in step 552. The standard interface compliant control then releases the first internal control object in step 556. At this point the changes have been applied.

Figure 20:
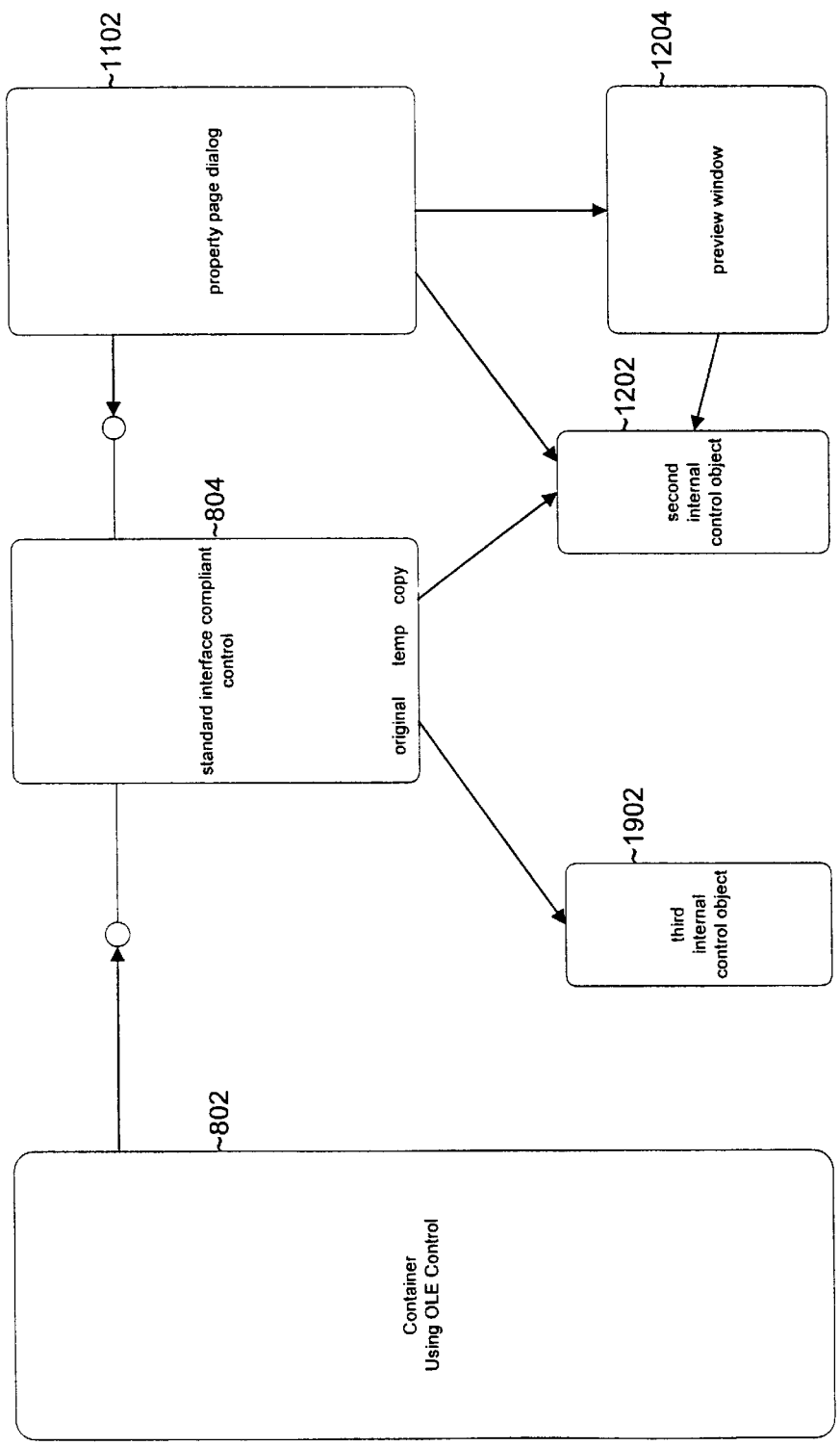
FIG. 20 is a block diagram illustrating the relationship between objects when the control of FIG. 19 sets the original pointer of the control to the third internal control object and releases the first internal control object.

Referring now to FIG. 20, a block diagram illustrating the standard interface compliant control 804 having set the original pointer to the third internal control object 1902 and having released the first internal control object is shown. Since the original pointer now references the third internal control object, methods invoked on the standard interface compliant control will be redirected to the third internal control object rather than the first internal control object, which has been destroyed. So, for example, when after the property page dialog invoked the method on the standard interface compliant control to apply the changes, the property page dialog invokes a method on the standard interface compliant control to display the control on the form, the third internal control object (with the changes applied) gets displayed in the form window rather than the first internal control object.

Figure 21:
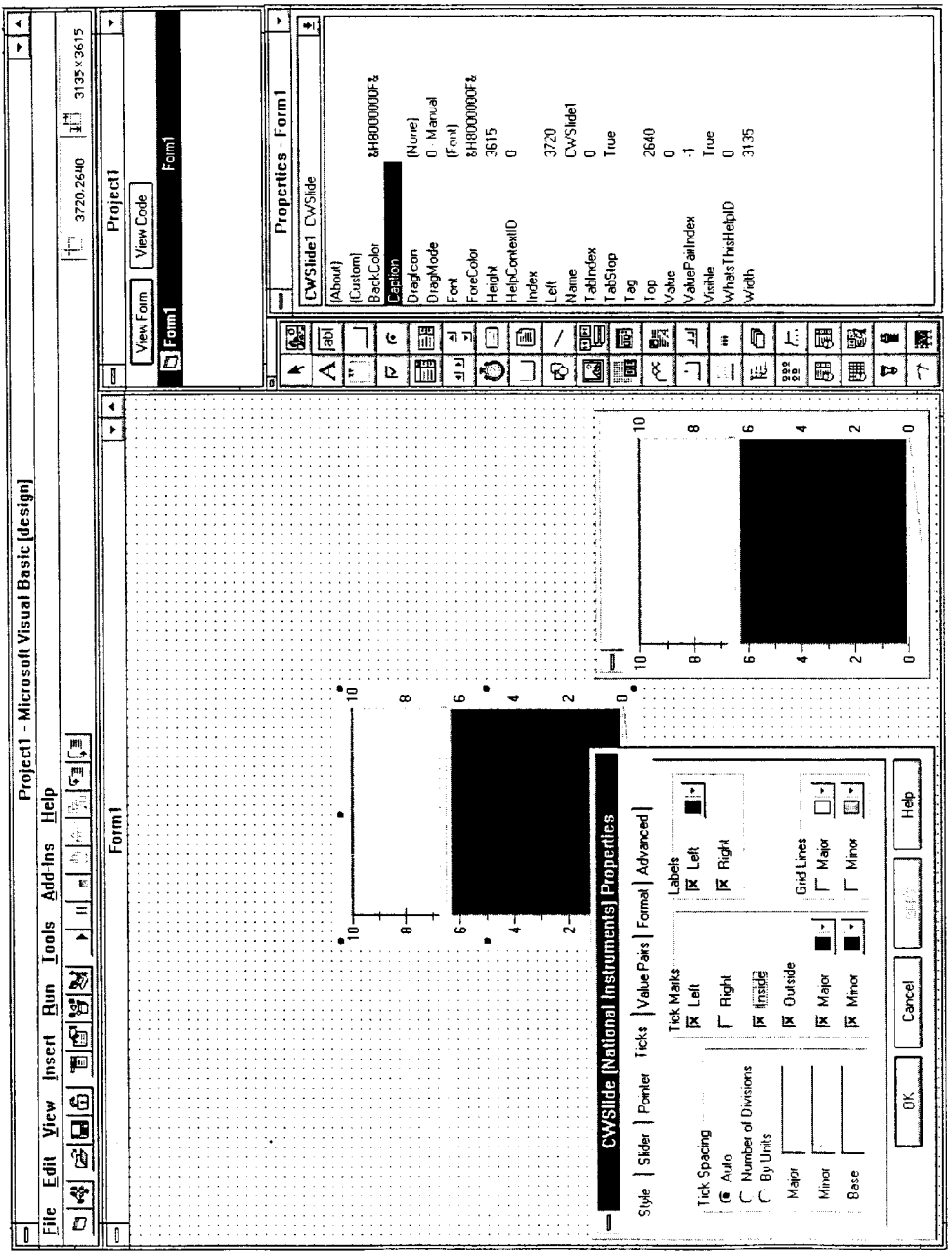
FIG. 21 is a screen shot showing the changes made to the second internal control object displayed in the preview window in FIGS. 15 through 18 having been applied to the first internal control object in the manner described in FIG. 20.

Referring now to FIG. 21, a screen shot shows the changes made to the control in FIGS. 15 through 18 applied to the control in the form window as described in steps 548, 552 and 556.

By releasing the first internal control object only after successfully creating the third internal control object, which is a copy of the second internal control object, and successfully assigning to the original pointer the temp pointer, i.e., to the third internal control object, the present invention advantageously provides a robust method of editing the control. The single assignment of the temp pointer to the original is an atomic operation. Whereas, alternative methods, such as leaving the pointers intact and copying the changes from the second internal control object to the first internal control object are not an atomic operations with respect to typical failures encountered while copying objects, such as exhausting available memory.

Figure 22:
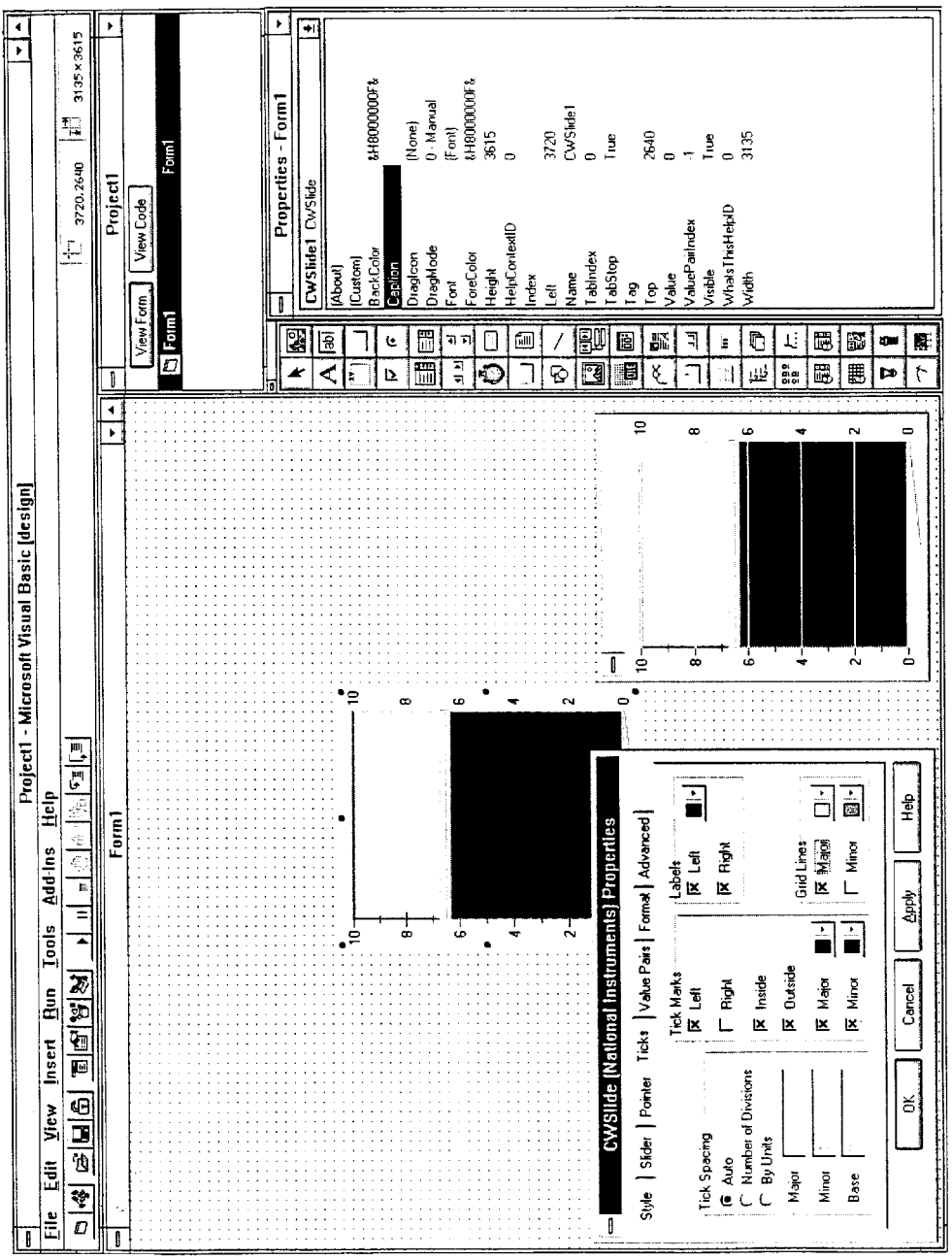
FIG. 22 is a screen shot of the control of FIG. 21 having had the major grid lines enabled via the "Major" Grid Lines check box with the change being reflected in the second internal control object of the preview window.

Referring now to FIG. 22, a screen shot of the control of FIG. 21 having had the major grid lines enabled via the "Major" Grid Lines check box with the change being reflected in the second internal control object of the preview window is shown.

Referring again to FIG. 5, the user decides whether or not he or she is finished editing the control for the time being in step 560 after having either applied or canceled the changes in step 540. If the user is not finished editing, the method returns to step 536 to make more changes. If the user is finished editing the control, the container releases the property page dialog in step 564. In response, the property page dialog releases the preview window in step 568. Then the property page dialog invokes a method on the standard interface compliant control to release the second internal control object in step 572.

Figure 23:
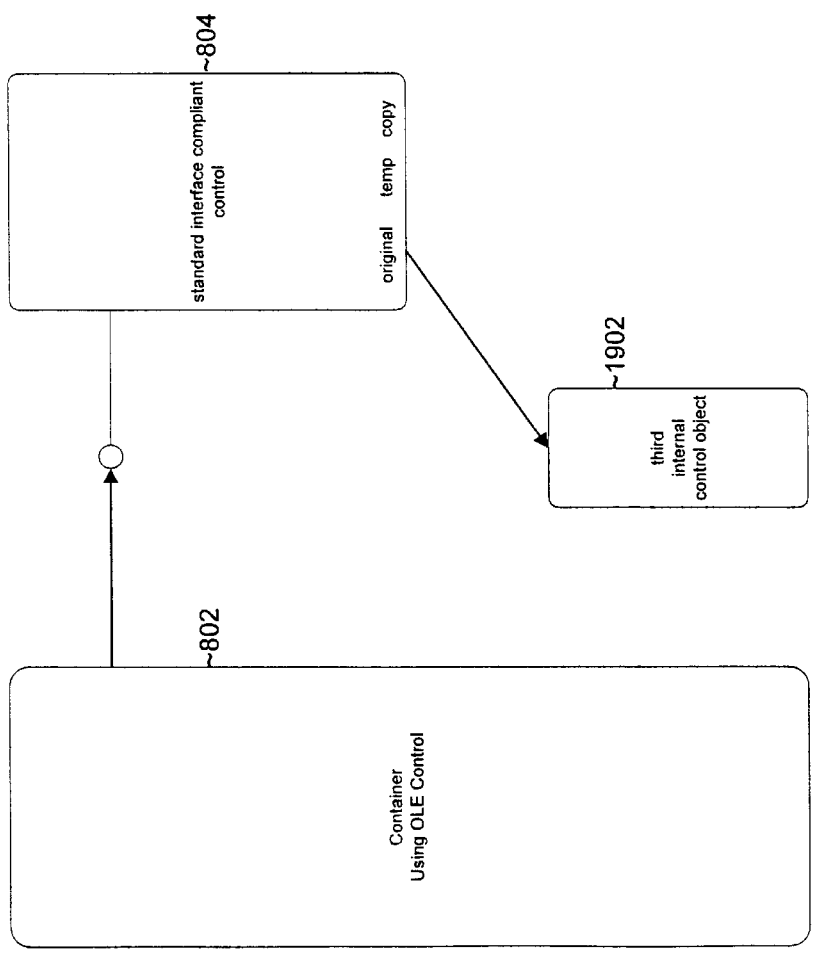
FIG. 23 is a block diagram illustrating the relationship between objects when the editing transaction of the control of FIG. 20 is complete.

Referring now to FIG. 23, a block diagram illustrating the relationship between the standard interface compliant control 804 and the third internal control object 1904 when the editing transaction of the control is complete is shown. The second internal control object, the property page dialog and the preview window objects have all been destroyed as described in steps 564, 568 and 572. The control is essentially back to the same state as in FIG. 8, except that the original pointer now refers to the third internal control object rather than the first internal control object.

Figure 24:
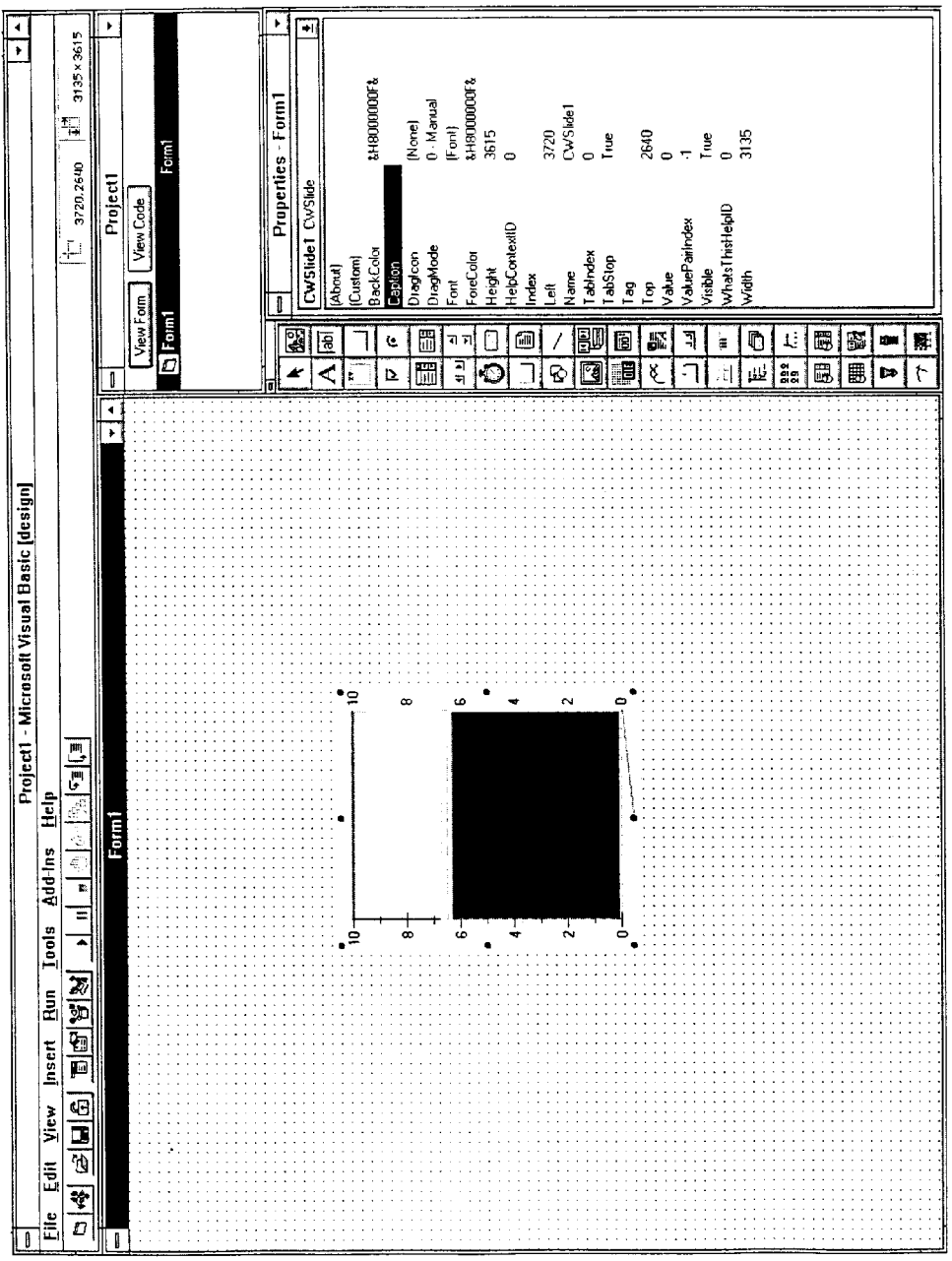
FIG. 24 is a screen shot of the control of FIG. 22 with the change of FIG. 22 having been canceled and the editing transaction completed.

Referring now to FIG. 24, a screen shot of the control of FIG. 22 with the change of FIG. 22 having been canceled is shown. The editing transaction is complete and the preview window and property page dialog window are no longer displayed.

By complying with the OLE control standard, the controls of the present invention advantageously provide a container independent set of controls which may be edited in the manner disclosed herein. The container independent feature of the controls alleviates the development time which would otherwise be required to use the controls in each desired container. The controls can advantageously be used in any container which supports the OLE control specification. Although the preferred embodiment of the present invention conforms to the Microsoft OLE control standard, the methods described herein may be applied to other similar standards for developing reusable user interface components.

Although the invention has been described for graphical controls, the invention contemplates non-graphical controls which employ the methods described. For example, a data acquisition control displays a graph of data it will acquire given a current configuration in a preview window. The graph has associated cursors. The editor of the control graphically interacts with the cursors, preferably via a mouse or other input device, to set trigger points or set a number of data points to acquire. Thus the preview window is used to display useful information associated a representation of a non-graphical control.

Additionally, although the invention has been described with a single graphical representation of a control in a single preview window, the invention contemplates controls in which different graphical representations of the control for different preview windows in different property page dialogs are displayed and edited. For example, in a first property page dialog clicking in the preview window associated with the first property page dialog causes a change in the state of the button, i.e., pressed or not pressed. In a second property page dialog, mouse movements in the preview window associated with the second property page dialog move and size graphical parts of the button.

Alternate Embodiments

The present invention contemplates two alternate embodiments in which no transactive copy of the control exists, i.e., the internal control objects do not exist. Rather, the control is the entire OLE control, but with additional editing functionality. In other words, the standard interface compliant control and the internal control objects are combined into a single control object. These two embodiments are described below.

In the first embodiment the OLE control has an alternate display method which is invoked to display the control. This alternate display method is used to display the control in a preview window. The user makes a change to the control via the property page dialog. The property page dialog invokes the alternate display method and passes parameters which have information about the change made by the user. The control with the changes reflected is drawn by the method in the preview window. Thus, the object's data is not modified until the user decides to apply the change. When the user applies the change, the object's data is modified and the change is reflected in the original display of the control, i.e., in the form window of the container by the normal means for OLE controls. An embodiment is contemplated in which more than one change is made by the user and "cached" by the preview window until the changes are either applied or canceled. The cumulative set of changes since the last apply or cancel is passed to the alternate display method.

In the second embodiment the control is displayed in a separate window, such as the property page dialog, in addition to the main form window. The control displayed in the property page dialog is edited via direct graphical user interaction. As each change is made to the control displayed in the property page dialog, the control object's data is correspondingly changed and the change is subsequently reflected to the control displayed in the form window.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A computer-implemented method for editing a control in a computer system, wherein the computer system includes a display screen, the method comprising:

displaying said control in a main window on the display screen;

selecting said control for an editing transaction in response to user input;

displaying a preview window on the display screen, wherein said preview window is automatically displayed in response to said user input selecting said control for said editing transaction;

displaying a copy of said control in said preview window, wherein said copy of said control is automatically displayed in said preview window in response to said user input selecting said control for said editing transaction;

receiving first user input indicating a desired change to said control, wherein said first user input indicating a desired change to said control is received after said displaying said copy of said control in said preview window;

displaying said copy of said control with said change in said preview window in response to said receiving said first user input indicating said desired change to said control;

determining if said change is desired to be applied to said control in response to second user input;

applying said change to said control in said main window if said change is desired to be applied to said control.

2. The method of claim 1, further comprising:

dropping said control in a container before said displaying said control in said main window;

creating said control in response to said dropping said control in said container.

3. The method of claim 1, further comprising:

displaying a property page dialog for said control, wherein said property page dialog is automatically displayed in response to said user input selecting said control for said editing transaction;

wherein said receiving first user input indicating said desired change to said control is performed via said property page dialog;

wherein said first user input comprises input to said property page dialog.

4. The method of claim 1, wherein said control displayed in said main window on the display screen is not changed during said displaying said copy of said control with said change in said preview window;

wherein said control displayed in said main window on the display screen is changed in response to said applying said change to said control.

5. The method of claim 1, wherein said control displayed in said main window on the display screen is not changed in response to said first user input indicating said desired change to said control;

wherein said control displayed in said main window on the display screen is changed in response to said applying said change to said control.

6. The method of claim 1, wherein said applying said change to said control includes displaying said control with said change in said main window on the display screen, wherein said applying said change to said control also includes modifying data of said control.

7. The method of claim 1, wherein said preview window and said copy of said control are not displayed after said applying said change to said control.

8. The method of claim 1, further comprising:

discarding said change if said change is not desired to be applied to said control;

wherein, when said change is discarded, said change is not applied to said control.

9. The method of claim 8, wherein said preview window and said copy of said control are not displayed after said discarding said change.

10. The method of claim 1, wherein said displaying said copy of said control with said change in said preview window comprises invoking a display method on said control to display said control with said change.

11. The method of claim 10, wherein said display method comprises input parameters, wherein at least a portion of said input parameters comprise information about said change.

12. The method of claim 1, wherein said copy of said control is displayed in said preview window on the display screen simultaneously with said control being displayed in the main window on the display screen; and wherein said copy of said control with said change is displayed in said preview window on the display screen simultaneously with said control being displayed in the main window on the display screen.

13. The method of claim 1,
wherein said copy of said control is displayed in said preview window on the display screen during a first period of time that said control is displayed in the main window on the display screen; and
wherein said copy of said control with said change is displayed in said preview window on the display screen during a second period of time that said control is displayed in the main window on the display screen.

14. The method of claim 1, wherein a user is able to view desired changes to said control on said copy of said control displayed in said preview window prior to said desired changes being applied to said control.

15. The method of claim 1,
wherein said receiving first user input indicating a desired change to said control comprises receiving a plurality of desired changes to said control;
wherein said displaying said copy of said control with said change in said preview window comprises displaying said copy of said control with said plurality of changes in response to said first user input indicating said plurality of desired changes to said control;
wherein said determining if said change is desired to be applied to said control comprises determining if said plurality of changes are desired to be applied to said control;
wherein said applying said change to said control in said main window comprises applying said plurality of changes to said control.

16. The method of claim 1, wherein said control comprises a reusable user interface component.

17. The method of claim 1, wherein said control is an OLE control.

18. The method of claim 1, wherein said control is an ActiveX control.

19. A computer system for editing a control, comprising:
a CPU;
memory coupled to the CPU;
a display screen for displaying the control in a main window on said display screen;
an input device operable to receive user input selecting said control for an editing transaction;
wherein the memory stores a computer program executable by the CPU, wherein the computer program is executable to automatically display a preview window on the display screen and to automatically display a copy of the control in said preview window on said display screen in response to said user input selecting said control for an editing transaction;
wherein the input device is operable to receive user input indicating a desired change to the control;
wherein the computer program is executable to display the control with said change in said preview window on said display screen in response to said user input indicating a desired change to the control;
wherein the input device is operable to receive user input indicating said change is desired to be applied to the control;
wherein the computer program is executable to apply said change to said control if said change is desired to be applied to said control.

20. The computer system of claim 19,
wherein the computer program is executable to display a property page dialog on the display screen, wherein said property page dialog is automatically displayed in response to said user input selecting said control for an editing transaction;
wherein said user input indicating said desired change to the control comprises input manipulating one or more properties on said property page dialog displayed on the display screen.

21. The computer system of claim 19, wherein said control displayed in said main window on the display screen is not changed when said copy of said control with said change is displayed in said preview window;
wherein said control displayed in said main window on the display screen is changed in response to said applying said change to said control.

22. The computer system of claim 19, wherein said control displayed in said main window on the display screen is not changed in response to said user input indicating said desired change to said control;
wherein said control displayed in said main window on the display screen is changed in response to said applying said change to said control.

23. The computer system of claim 19, wherein the computer program is also executable to display said control with said change in said main window when applying said change;
wherein the computer program is also executable to modify data of said control when applying said change.

24. The computer system of claim 19, further comprising:
wherein the computer program is executable to discard said change if said change is not desired to be applied to said control;
wherein, when said change is discarded, said change is not applied to said control.

25. The computer system of claim 19,
wherein the computer program is executable to display said copy of the control in said preview window simultaneously with said control being displayed in the main window; and
wherein the computer program is executable to display said copy of said control with said change in said preview window simultaneously with said control being displayed in the main window of the display screen.

26. A computer system for editing an control, comprising:
a display screen;
an input device;
means for displaying said control in a main window on said display screen;
means for selecting said control for an editing transaction in response to user input received by said input device;
means for creating a preview window;
means for displaying said control in said preview window on said display screen;
wherein said means for creating a preview window and said means for displaying said control in said preview window automatically operate in response to said means for selecting said control for an editing transaction;
means for receiving a desired change to said control in response to user input received by said input device;
means for displaying said control with said change in said preview window on said display screen;
means for determining if said change is desired to be applied to said control; and means for applying said change to said control if said change is desired to be applied to said control.

27. A computer readable storage media comprising program instructions for editing a control in a computer system, wherein the computer system includes a display screen, wherein the program instructions are executable to implement:
   displaying said control in a main window on the display screen;
   selecting said control for an editing transaction in response to user input;
   displaying a preview window on the display screen, wherein said preview window is automatically displayed in response to said user input selecting said control for said editing transaction;
   displaying a copy of said control in said preview window, wherein said copy of said control is automatically displayed in said preview window in response to said user input selecting said control for said editing transaction;
   receiving first user input indicating a desired change to said control, wherein said first user input indicating a desired change to said control is received after said displaying said copy of said control in said preview window;
   displaying said copy of said control with said change in said preview window in response to said receiving said first user input indicating said desired change to said control;
   determining if said change is desired to be applied to said control in response to second user input;
   applying said change to said control in said main window if said change is desired to be applied to said control.

28. The media of claim 27, wherein the program instructions are further executable to implement:
   dropping said control in a container before said displaying said control in said main window;
   creating said control in response to said dropping said control in said container.

29. The media of claim 22, wherein the program instructions are further executable to display a property page dialog for said control in response to said user input selecting said control for said editing transaction;
   wherein said receiving first user input indicating said desired change to said control is performed via said property page dialog;
   wherein said first user input comprises input to said property page dialog.

30. The media of claim 27, wherein said control displayed in said main window on the display screen is not changed during said displaying said copy of said control with said change in said preview window;
   wherein said control displayed in said main window on the display screen is changed in response to said applying said change to said control.

31. The media of claim 27, wherein said control displayed in said main window on the display screen is not changed in response to said first user input indicating said desired change to said control;
   wherein said control displayed in said main window on the display screen is changed in response to said applying said change to said control.

32. The media of claim 27, wherein said applying said change to said control includes displaying said control with said change in said main window;
   wherein said applying said change to said control includes modifying data of said control.

33. The media of claim 27, wherein said preview window and said copy of said control are not displayed after said applying said change to said control.

34. The media of claim 27, wherein the program instructions are further executable to discard said change if said change is not desired to be applied to said control;
   wherein, when said change is discarded, said change is not applied to said control in said main window.

35. The media of claim 34, wherein said preview window and said copy of said control are not displayed after said discarding said change to said control.

36. The media of claim 27,
   wherein said displaying said copy of said control with said change in said preview window comprises invoking a display method on said control to display said control with said change.

37. The media of claim 36,
   wherein said display method comprises input parameters, wherein at least a portion of said input parameters comprise information about said change.

38. The media of claim 27,
   wherein said copy of said control is displayed in said preview window simultaneously with said control being displayed in the main window; and
   wherein said copy of said control with said change is displayed in said preview window simultaneously with said control being displayed in the main window of the display screen.

39. The media of claim 27,
   wherein said copy of said control is displayed in said preview window during a first period of time that said control is displayed in the main window of the display screen; and
   wherein said copy of said control with said change is displayed in said preview window during a second period of time that said control is displayed in the main window of the display screen.

40. The media of claim 27, wherein a user is able to view desired changes to said control on said copy of said control displayed in said preview window prior to said desired changes being applied to said control.

41. The media of claim 27,
   wherein said receiving first user input indicating a desired change to said control comprises receiving a plurality of desired changes to said control;
   wherein said displaying said copy of said control with said change in said preview window comprises displaying said copy of said control with said plurality of changes in response to said first user input indicating said plurality of desired changes to said control;
   wherein said determining if said change is desired to be applied to said control comprises determining if said plurality of changes are desired to be applied to said control;
   wherein said applying said change to said control in said main window comprises applying said plurality of changes to said control.

42. The media of claim 27, wherein said control comprises a reusable user interface component.

43. The media of claim 27, wherein said control is an OLE control.

44. The media of claim 27, wherein said control is an ActiveX control.

* * * * *

UNITED STATES PATENT AND TRADEMARK OFFICE
CERTIFICATE OF CORRECTION

PATENT NO. : 6,515,682 B1
DATED : February 4, 2003
INVENTOR(S) : Washington et al.

It is certified that error appears in the above-identified patent and that said Letters Patent is hereby corrected as shown below:

<u>Column 15,</u>
Line 40, please delete "claim 22" and substitute -- claim 27 --.

Signed and Sealed this

Seventeenth Day of June, 2003

JAMES E. ROGAN
*Director of the United States Patent and Trademark Office*